(12) United States Patent
Hara

(10) Patent No.: US 7,460,272 B2
(45) Date of Patent: Dec. 2, 2008

(54) IMAGE PROCESSING APPARATUS, IMAGE PROCESSING METHOD, AND IMAGE PROCESSING PROGRAM

(75) Inventor: Kenji Hara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 930 days.

(21) Appl. No.: 11/013,359

(22) Filed: Dec. 17, 2004

(65) Prior Publication Data
US 2005/0270582 A1 Dec. 8, 2005

(30) Foreign Application Priority Data
Jun. 8, 2004 (JP) ............ P2004-170451

(51) Int. Cl.
H04N 1/40 (2006.01)
H04N 1/405 (2006.01)
H04N 1/60 (2006.01)
H04N 1/409 (2006.01)
G06K 9/48 (2006.01)
G06K 9/40 (2006.01)

(52) U.S. Cl. .......... 358/1.9; 358/2.1; 358/3.26; 358/3.06; 358/3.03; 358/3.05; 358/3.21; 382/199; 382/266; 382/162; 382/167

(58) Field of Classification Search ............ 358/518, 358/1.9, 2.1, 3.26, 3.06, 3.03, 3.05, 3.21; 382/199, 266, 162, 167
See application file for complete search history.

(56) References Cited

U.S. PATENT DOCUMENTS

| | | | |
|---|---|---|---|
| 5,313,286 A | | 5/1994 | Sugiura et al. |
| 5,416,596 A | * | 5/1995 | Suzuki et al. ............ 358/3.1 |
| 5,539,842 A | * | 7/1996 | Schwartz ............ 382/232 |
| 2003/0076515 A1 | | 4/2003 | Schuppan |

FOREIGN PATENT DOCUMENTS

| | | |
|---|---|---|
| JP | A-4-120975 | 4/1992 |
| JP | 2877356 B2 | 1/1999 |
| JP | A 2001-144979 | 5/2001 |
| WO | WO 02/30103 A1 | 4/2002 |

* cited by examiner

Primary Examiner—Edward L. Coles
Assistant Examiner—Charlotte M Baker
(74) Attorney, Agent, or Firm—Oliff & Berridge, PLC

(57) ABSTRACT

An image processing apparatus includes a correction data generation section, a binarization section, an edge pixel setting section, and a selection section. The correction data generation section generates correction data. The binarization section binarizes one of the correction data generated and contone image data that has been subjected to the one of color correction and density correction, to generate corrected binary data. The edge pixel setting section sets a pixel, in binary image data, assumed to be an edge as an edge pixel. The selection section selects, for the pixel set as the edge pixel, the corrected binary data and selects, for a pixel not being set as the edge pixel, the binary image data. The edge pixel setting section detects presence of the edge from the binary image data.

19 Claims, 11 Drawing Sheets

| CORRECTION SIGNAL | BINARY PIXEL SIGNAL | |
|---|---|---|
| | 0 (WHITE) | 1 (BLACK) |
| POSITIVE AREA | ○ | × |
| 0 AREA | × | × |
| NEGATIVE AREA | × | ○ |

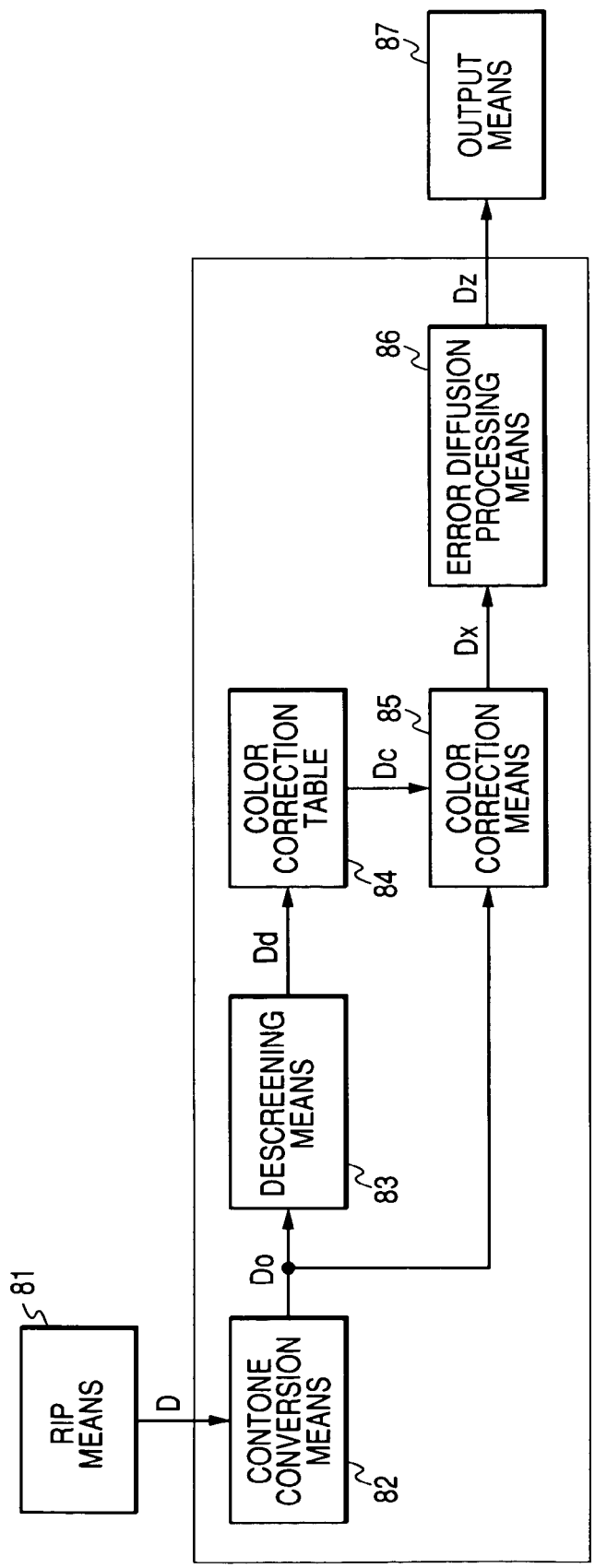

IMAGE PROCESSING APPARATUS, IMAGE PROCESSING METHOD, AND IMAGE PROCESSING PROGRAM

BACKGROUND OF THE INVENTION

1. Field of the Invention

This invention relates to an image processing technology using binary image data and contone image data both of which are based on the same image to perform a color correction or a density correction with respect to the binary image data for providing binary image data after subjected to the correction.

2. Description of the Related Art

In recent years, a method called CTP (computer to plate) using digitalized print original data to directly make a machine plate for printing by a digital plate making apparatus has been adopted in a plate making process. To make a machine plate for printing according to the CTP, RIP (Raster Image Processing) is performed for the present data described in a page description language to prepare contone (color) bit map data, and the bit map data is converted into binary image data having a dot component for each color component by performing screen processing and then a machine plate is made from the binary image data. If a machine plate is made by the CTP, when the present proofreading is performed, the image data binarized by the RIP usually is output to a color proofreading system called DDCP (direct digital color proof), whereby a galley proof is provided.

In recent years, remote color proofreading for easily providing a galley proof in each company, etc., has been performed without using an expensive machine such as the DDCP. In the remote color proofreading, a galley proof is provided using a printer installed in each company, etc. However, since the printers differ in characteristics, color conversion is performed in each printer for providing a galley proof so that output is produced in the same colors regardless of the printer. Accordingly, press run and the galley proof are almost matched with each other in color appearance and color proofreading work is accomplished reliably. Under present circumstances, color adjustment is made in the state of the bit map data and output is produced according to the output system of each printer, whereby a galley proof is provided.

However, even if color match is accomplished, when print is executed, the proof galley and the press run may differ in appearance depending on the screen put at the plate making time. Thus, it is desirable that a galley proof subjected to screen processing similar to that in press run should be provided. To do this, binary image data after subjected to screen processing may be received and the color reproduction difference between the printers may be corrected before a galley proof is produced. Such attempts have been made.

FIG. 12 is a block diagram to show an example of an image processing apparatus according to a related art. In the figure, numeral 81 denotes RIP means, numeral 82 denotes contone conversion means, numeral 83 denotes descreening means, numeral 84 denotes a color correction table, numeral 85 denotes color correction means, numeral 86 denotes error diffusion processing means, and numeral 87 denotes output means.

First, the RIP means 81 converts data into bit map data and performs screen processing for the bit map data to provide binarized image data D, and supplies the image data D to the contone conversion means 82. The image data D has a dot component as the screen processing is performed. Next, the contone conversion means 82 artificially converts the supplied binary image data D into contone image data Do, and the descreening means 83 performs descreening processing for the image data Do, whereby the dot component is removed from the image data Do to generate image data Dd having halftone.

Next, color correction data Dc to make a color correction to the image data Dd is read from the color correction table 84. The color correction means 85 adds the color correction data Dc and the contone image data Do having a dot component and image data Dx provided by adding the data is input to the error diffusion processing means 86, which then performs error diffusion processing for the input image data, thereby converting the contone image data to binary image data Dz, and outputs the provided image data to the output means 87. The image data thus output has the original dot component and becomes image data subjected to color matching, so that a highly accurate galley proof can be provided.

In the system, however, as the correction value is added, ON and OFF pixels produced by the error diffusion processing are produced independently of the original halftone-dot structure. Therefore, the ON and OFF pixels produced independently of the original halftone-dot structure are conspicuous when the correction value is large or in a low-density area or a high-density area; this is a problem. A white patch occurs in a dot and is conspicuous and thus the image quality of the whole image is degraded. Since the error diffusion processing means 86 assumes the range of pixel values of a usual contone image, for example, if a negative value as the color correction data Dc is added to 0% pixel of the contone image data Do, correction to 0% is made and the color processing correction result cannot precisely be reflected. In fact, the contone image data Do contains only density 0% and 100% pixels and the color correction data Dc has positive and negative values and thus the pixel value range is often exceeded by adding the correction value to a simple contone image, in which case no correction is made; this is a problem.

It is known to provide a technology wherein when a binary image containing a halftone-dot structure is converted into a contone image, an appropriate filter coefficient is used, whereby the binary image is converted into a contone image so as to retain the halftone-dot structure, and error diffusion processing is performed for the contone image with the halftone-dot structure retained for again converting the contone image into a binary image and a galley proof is produced.

In the system, a diffusing filter called soft focus is used and a weak low-pass filter to such an extent that the dot shape can be maintained is applied. However, because of the diffusing filter, the shape of a small dot as in a low-density or high-density area is not left and an almost uniform contone image results and if the contone image is again converted into a binary image, a white patch or a crush occurs. As an ON or OFF pixel appears in each of pixels making up a grid of dots also in an intermediate-density area, the cluster of the pixels making up the grid of dots is crushed. Thus, the image quality is degraded and the difference between the galley proof and the press run grows. Further, to convert the binary image into a contone image while retaining various halftone-dot structures, the binary image must be analyzed to set an appropriate filter coefficient; this is also a problem.

Further, it is known to provide a technology of performing color correction processing fitted to the characteristics of a color printer for binary image data. In this art, first, after binary image data is converted into contone image data, color correction processing is performed so as to fit to the characteristics of the color printer and then the contone image data subjected to the color correction processing is binarized and the number of print pixels fitted to the contone data is determined. When the number of print pixels is determined, the pixel placement of the binary image data is referenced, whereby the print pixels are placed. If the number of print pixels is increased or decreased, a table is referenced and pixels at what positions are to be increased or decreased is determined. An error occurring when pixels are placed, particularly an error occurring in conversion from contone data to binary data is diffused to other pixels.

In the image data processing method, as the processing is performed, the binary image data most suitable for the color printer is generated and an image close to the present image can be provided. However, since a predefined table is used when the number of dots of the binary image is increased or decreased, if the periods differ between tables in determining the priority of increasing or decreasing the number of dots and the dots of the binary image, interference occurs; this is a problem.

SUMMARY OF THE INVENTION

Therefore, the invention provides an image processing apparatus and an image processing method capable of making a color correction or a density correction to a binary image containing a halftone-dot structure with maintaining the halftone-dot structure for outputting a high-quality image on an output unit. The invention also provides an image processing program for causing a computer to execute such an image processing method and a storage medium storing the image processing program.

One embodiment of the invention includes inputting binary image data and contone image data both of which are based on an original image, performing one of color correction and density correction with respect to the contone image data to generate correction data indicating a correction amount for the binary image data, correcting the binary image data in accordance with the correction data to obtain output binary data that is subjected to the one of the color correction and the density correction. According to the one embodiment of the invention, in the correcting of the binary image data, when a presence of an edge is detected, a corrected position for the edge portion is specified in accordance with the correction data, such pixel is set as an edge pixel, corrected binary data that is the corrected data binarized by a binarization section is selected for the edge pixel and is set as output data, and the binary image data is selected for the other pixels and is set as the output data.

As a method for setting the edge pixel, when the correction data increases the pixel value of the contone image data, a pixel located in one of regions sandwiching the edge therebetween is set as the edge pixel; and when the correction data lessens the pixel value of the contone image data, a pixel located in the other of the regions sandwiching the edge therebetween is set as the edge pixel. For example, it is assumed that white is the lowest pixel value with respect to a specific color. If the correction data increases the pixel value, the pixel positioned on the white side of the regions sandwiching the edge therebetween is set as the edge pixel and the corrected binary data is placed in the portion, thereby making adjustment for increasing the density of the specific color as the whole image. If the correction data lessens the pixel value, the pixel positioned on the specific color side of the regions sandwiching the edge therebetween is set as an edge pixel and the corrected binary data is placed in the portion, thereby making adjustment for lessening the density as the whole image.

With regard to the contone image data, the binary image data may be smoothed and may be converted into contone data to generate smoothing data, and the smoothing data may be used as the contone image data. The correction data may be data indicating difference between the contone image data and the contone image data that has been subjected to the color correction or the density correction. Further, the corrected binary data may be found by the error diffusion method.

According to the one embodiment of the invention, to correct the binary image data, the contone image data based on the same image is used and the correction data based on the correction result is made to act on the edge portion of the binary image data for making an apparent color correction or density correction to the binary image data. Accordingly, for example, in the binary image data containing halftone dots subjected to screen processing, the size of each cluster of halftone dots can be corrected and apparent density adjustment can be made with good accuracy. Such a density adjustment is made for each plate used, whereby color adjustment can be made. At this time, to make adjustment, one of the edges is set as an edge pixel to be corrected and correction is made, so that the cluster of halftone dots is maintained without being crushed and the output binary data of high quality can be provided.

BRIEF DESCRIPTION OF THE DRAWINGS

Embodiments of the present invention will be described in detail based on the following figures, wherein:

FIG. 12 is a block diagram to show an example of an image processing apparatus in a related art.

DETAILED DESCRIPTION OF THE PREFERRED EMBODIMENTS

Figure 1:
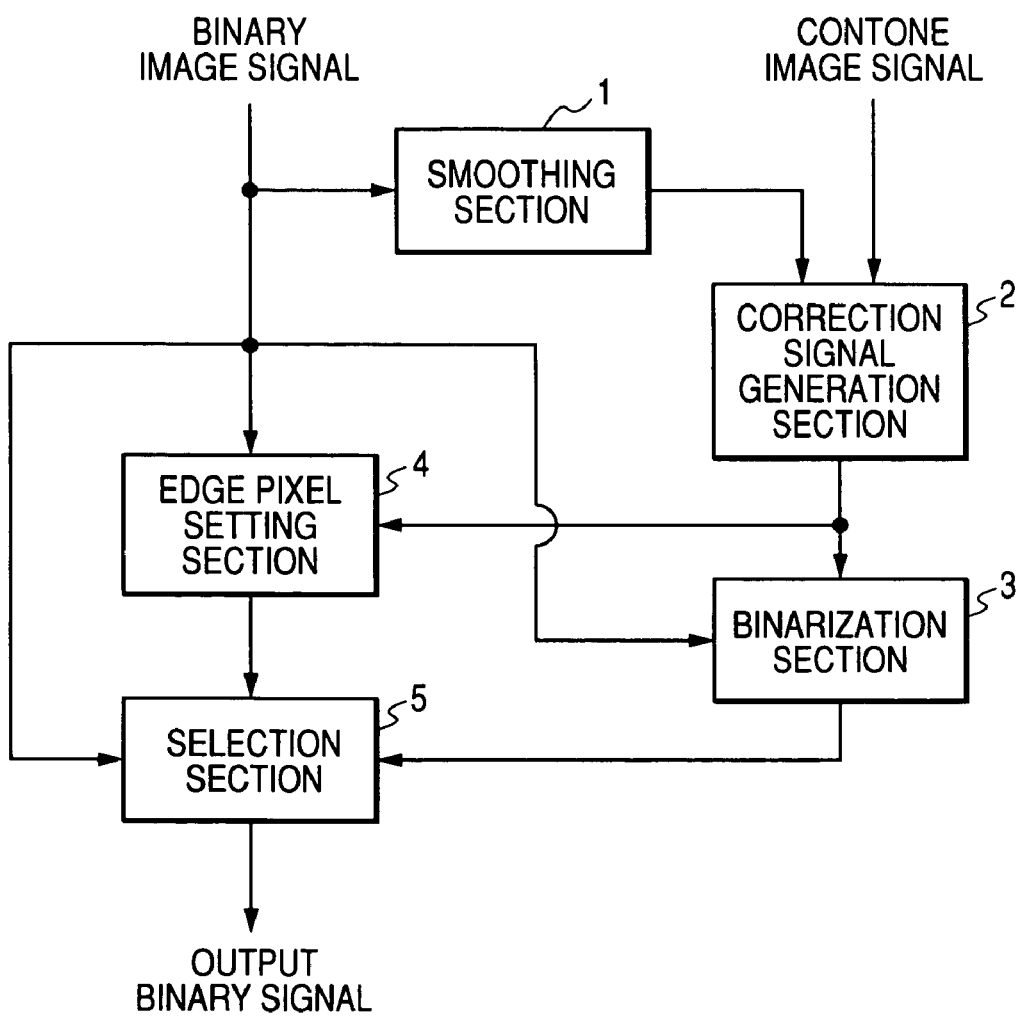
FIG. 1 is a block diagram showing an image processing apparatus and an image processing method according to one embodiment of the invention.

FIG. 1 is a block diagram showing an image processing apparatus and an image processing method according to one embodiment of the invention. In the figure, numeral 1 denotes a smoothing section, numeral 2 denotes a correction-signal generation section, numeral 3 denotes a binarization section, numeral 4 denotes an edge pixel setting section, and numeral 5 denotes a selection section. In a first embodiment, a binary image signal generated from a contone (color) image (continuous-tone image) or further a contone image signal is received as input. If a contone image signal is also received, the contone image signal is based on the same original image as the binary image signal. For example, when an original is a contone image signal, a halftone image provided by performing screen processing for the original may be adopted as a binary image signal. If the original image is a color image, a binary image signal is generated for each color component. Here, processing performed for the binary image signal of one of the color components will be discussed; similar processing can also be performed for the binary image signals of other color components. In the description that follows, as to the binary image signal, 1 denotes black and 0 denotes white and as to the contone image signal, for each color component, 0 denotes white and 255 denotes the maximum-density color of the color component.

The smoothing section 1, in the configuration wherein no contone image signal is input, performs smoothing processing for a binary image signal and converts the binary image signal into a contone image signal to generate a smoothing signal. If the original image is a color image and the correction-signal generation section 2 performs color correction processing, a color image needs to be generated as the contone image signal. Thus, smoothing processing may be performed not only for the binary image signal of the color component to be processed, but also for the binary image signals of other color components making up the original image for generating a smoothing signal to provide a color contone image signal. Of course, if a contone image signal is given separately, no smoothing section 1 may be provided or output of the smoothing section 1 may be unselected.

The correction-signal generation section 2 performs a color correction or a density correction with respect to the contone image signal and, for example, calculates a difference between the original contone image signal and the corrected one and generates the difference as a correction signal used to correct the binary image signal. If the contone image signal is a color image, color correction processing is performed with the color image intact. However, to generate a correction signal, the difference about the color component corresponding to the binary image signal may be calculated. Of course, to perform the color correction processing for each color component, the color correction processing may be performed only for the color component corresponding to the binary image signal.

The binarization section 3 binarizes the correction signal generated by the correction-signal generation section 2 to generate a correction binary signal. In the binarization processing, for example, an error diffusion method for calculating an error from the correction signal and the output binary signal and propagating the error to later given pixel processing can be used. Of course, the binarization processing method is not limited to the error diffusion method.

The edge pixel setting section 4 sets a pixel in the binary image signal assumed to be an edge as an edge pixel. More specifically, the presence of an edge is detected from the binary image signal and if the correction signal generated by the correction-signal generation section 2 is a signal for increasing the pixel value of the contone image signal, the pixel positioned on one side of the areas sandwiching the detected edge, here on a white pixel side is assumed to be an edge and is set as an edge pixel. If the correction signal generated by the correction-signal generation section 2 is a signal for lessening the pixel value of the contone image signal, the pixel positioned on an opposite side of the areas sandwiching the detected edge, here on a black pixel side is assumed to be an edge and is set as an edge pixel. Alternatively, if the presence of an edge is detected from the pixel values of a given pixel of the binary image signal and a predetermined neighboring pixel, when the pixel value of the given pixel of the binary image signal is one of the two values (here, white) and the correction signal generated by the correction-signal generation section 2 is a signal for increasing the pixel value of the contone image signal corresponding to the given pixel, the given pixel is assumed to be an edge and is set as an edge pixel; when the pixel value of the given pixel of the binary image signal is the other value (here, black) and the correction signal generated by the correction-signal generation section 2 is a signal for lessening the pixel value of the contone image signal corresponding to the given pixel, the given pixel is assumed to be an edge and is set as an edge pixel. If the correction signal generated by the correction-signal generation section 2 is a signal for scarcely changing the pixel value of the contone image signal, neither of the pixels sandwiching the edge is assumed to be an edge.

The presence of an edge can be detected as follows: For example, each pixel of the binary image signal is adopted as a given pixel in order, exclusive ORing of the given pixel and each predetermined neighboring pixel is performed, and when ORing of the exclusive OR operation results is true, the presence of an edge can be detected. Alternatively, a subtraction may be performed between the given pixel and each predetermined neighboring pixel and when the sum of the subtraction results is not 0, the presence of an edge can be detected. Further alternatively, a pattern for detecting the presence of an edge may be previously stored and when the pattern and a pattern of a given pixel and a predetermined neighboring pixel match, the presence of an edge can be detected. Of course, any other method may be used.

The selection section 5 selects the correction binary signal generated by the binarization section 3 for the pixel set as the edge pixel by the edge pixel setting section 4 and selects the binary image signal for the pixel not set as the edge pixel by the edge pixel setting section 4 for providing an output binary signal.

Figure 2A:
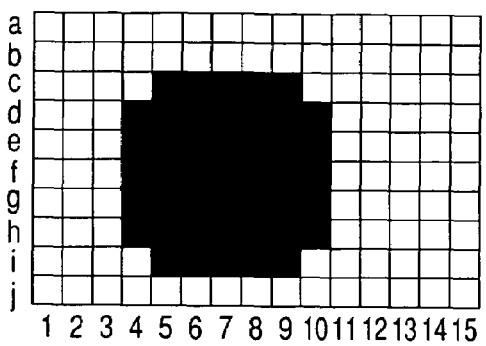
FIGS. 2A to 2E are explanatory views showing a specific example of the operation of the image processing apparatus and the image processing method according to one embodiment of the invention.

FIGS. 2A to 2E are explanatory views showing a specific example of the operation of the image processing apparatus and the image processing method according to one embodiment of the invention. It is assumed that a halftone image subjected to screen processing is input as a binary image signal. FIG. 2A shows one cluster of the halftone dots. The binary image signal contains an infinite number of such halftone-dot clusters and each cluster has a size responsive to the density of the original image.

The binary image signal containing an infinite number of such halftone-dot clusters is passed to the smoothing section 1, the edge pixel setting section 4, and the selection section 5. As the binary image signal is smoothed by the smoothing section 1, a contone image signal having gray scale can be provided. If the original image is a color image, smoothing processing is performed for the binary image signal of each color component, whereby an image signal having gray scale can be provided for each color component and thus the image signals may be collected to a contone image signal. Of course, if a contone image signal is given separately from the binary image signal, the given contone image signal is used.

The contone image signal is subjected to the color correction or density correction processing in the correction-signal generation section 2. A correction signal for correcting the binary image signal is generated from the contone image signals before and after subjected to the processing. As the color correction or density correction is made, for example, the characteristic difference between output units can be corrected. Of course, correction may be made for any other purpose. The generated correction signal is passed to the edge pixel setting section 4 for use to determine the pixel assumed to be an edge. The correction signal is also passed to the binarization section 3, which then binarizes the correction signal by a predetermined binarization method such as the error diffusion method and converts the signal into a correction binary signal in correcting the binary image signal and then passes the correction binary signal to the selection section 5.

Figure 2B:
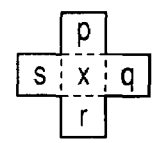

The edge pixel setting section 4 first detects the presence of an edge from the binary image signal. As a method of detecting the presence of an edge, various methods have been proposed. Here, by way of example, a determination is made using a given pixel x and pixels pqrs above and below and at the right and left of the given pixel x, as shown in FIG. 2B. For example, exclusive ORing of the given pixel x and the pixels pqrs above and below and at the right and left of the given pixel x is performed and if ORing of the exclusive OR operation results is true, it is seen that an edge exists. Alternatively, a subtraction may be performed between the given pixel x and the pixels pqrs above and below and at the right and left of the given pixel x, and when the sum of the subtraction results is not 0, the presence of an edge can be detected. Further alternatively, a pattern for determining that an edge exists when the given pixel x and the pixels pqrs above and below and at the right and left of the given pixel x shown in FIG. 2B are referenced may be previously stored, and when the pattern and the values of the given pixel x and the pixels pqrs above and below and at the right and left of the given pixel x match, the presence of an edge can also be detected. Of course, any other method may be used.

Figure 2C:
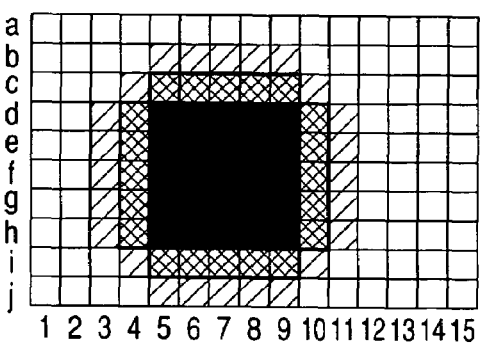

FIG. 2C shows pixels detected as the presence of an edge by performing the exclusive ORing of the given pixel x and the pixels pqrs above and below and at the right and left of the given pixel x, for example. In FIG. 2C, the hatched pixels are pixels where the presence of an edge is detected in white pixels and the crosshatched pixels are pixels where the presence of an edge is detected in black pixels.

Whether or not each pixel detected as the presence of an edge is assumed to be an edge, namely, is to be processed is determined using the pixel value of the binary image signal and the correction signal generated by the correction-signal generation section 2. Basically, if the correction signal is a signal for making the color of the image darker or increasing the density of the image, for example, namely, is a signal for increasing the pixel value of the contone image signal, a correction is made so as to enlarge the size of the cluster of halftone dots. In contrast, if the correction signal is a signal for making the color of the image lighter or decreasing the density of the image, for example, namely, is a signal for lessening the pixel value of the contone image signal, a correction is made so as to shrink the size of the cluster of halftone dots.

Since such a correction is made, when the correction signal is a signal for increasing the pixel value of the contone image signal, black pixels are appropriately placed on the white pixel side of the edge in accordance with the correction signal. Thereby, the size of the halftone-dot cluster is somewhat enlarged and the apparent density of the binary image signal can be increased. Therefore, when the correction signal is a signal for increasing the pixel value of the contone image signal, each hatched pixel in FIG. 2C is set as a pixel assumed to be an edge. When the correction signal is a signal for increasing the pixel value of the contone image signal, each black pixel crosshatched in FIG. 2C is not assumed to be an edge and is not processed.

Figure 2D:
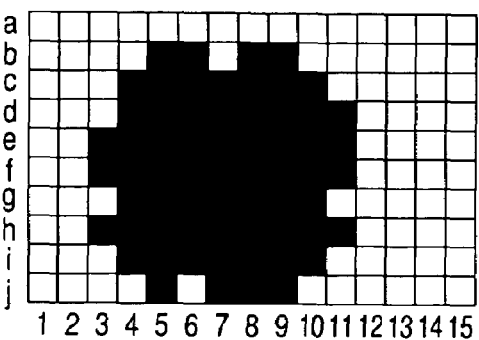

As the processing is thus performed, black pixels are added to the periphery in accordance with the correction signal, for example, as shown in FIG. 2D, and the halftone-dot cluster is somewhat enlarged, so that the apparent density can be increased.

When the correction signal is a signal for lessening the pixel value of the contone image signal, white pixels are appropriately placed on the black pixel side of the edge in accordance with the correction signal. Thereby, the size of the halftone-dot cluster is somewhat shrunk and the apparent density of the binary image signal can be decreased. Therefore, when the correction signal is a signal for lessening the pixel value of the contone image signal, each crosshatched pixel in FIG. 2C is set as a pixel assumed to be an edge. When the correction signal is a signal for lessening the pixel value of the contone image signal, each white pixel hatched in FIG. 2C is not assumed to be an edge and is not processed.

Figure 2E:
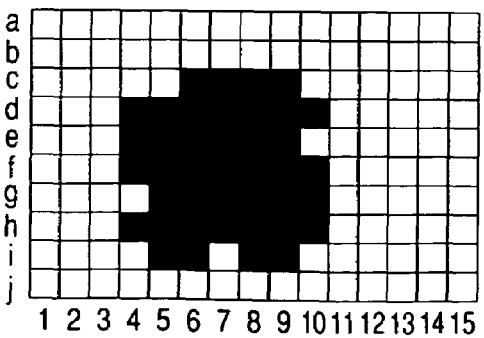

As the processing is thus performed, black pixels on the periphery of the cluster are appropriately replaced with white pixels in accordance with the correction signal, for example, as shown in FIG. 2E, and the halftone-dot cluster is somewhat shrunk, so that the apparent density can be decreased.

Figure 3A:
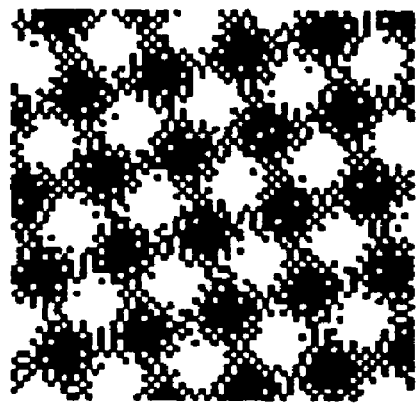
FIGS. 3A to 3D are comparison drawings between specific examples of the processing results according to the invention and each related art.
Figure 3B:
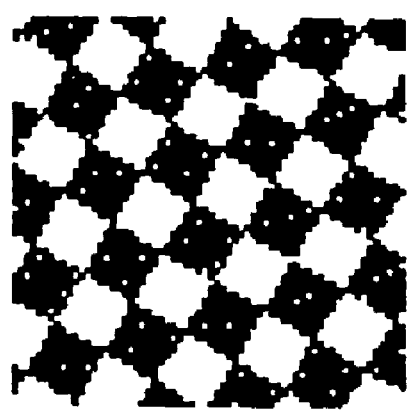

FIGS. 3A to 3D are comparison drawings between specific examples of the processing results according to the embodiment of the invention and each prior art. FIG. 3A shows the processing result of a binary image signal containing halftone dots by the method described in WO02/30103. The shapes of the clusters of halftone dots are crushed, degrading the image quality. FIG. 3B shows the processing result of a binary image signal containing halftone dots by the method described in JP-A-2001-144979. White patch pixels occur in the clusters of halftone dots. Thus, degradation of the image quality is also conspicuous.

Figure 3C:
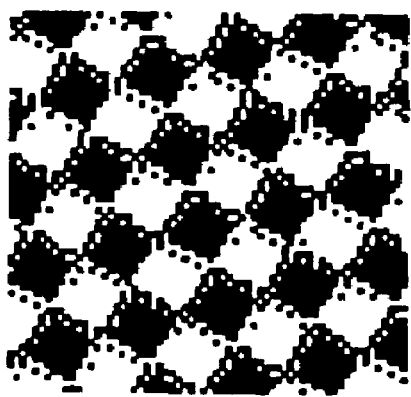

FIG. 3C shows an example of a result of processing both black and white pixels sandwiching the edge when the presence of an edge is detected. In this case, it is seen that pseudo contours occur in the contours of each cluster of halftone dots. Thus, the image quality is also degraded.

Figure 3D:
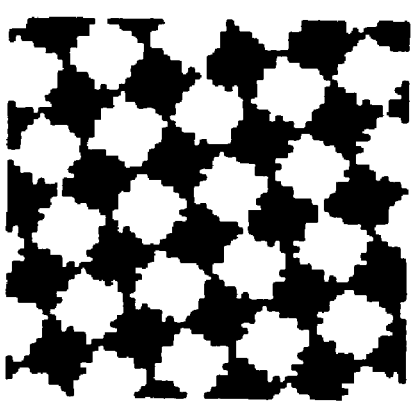

FIG. 3D shows an example of the processing result according to the embodiment of the invention. The shapes of the clusters of halftone dots become somewhat uneven, but are almost maintained. Thus, almost good image quality can be provided.

Figure 4:
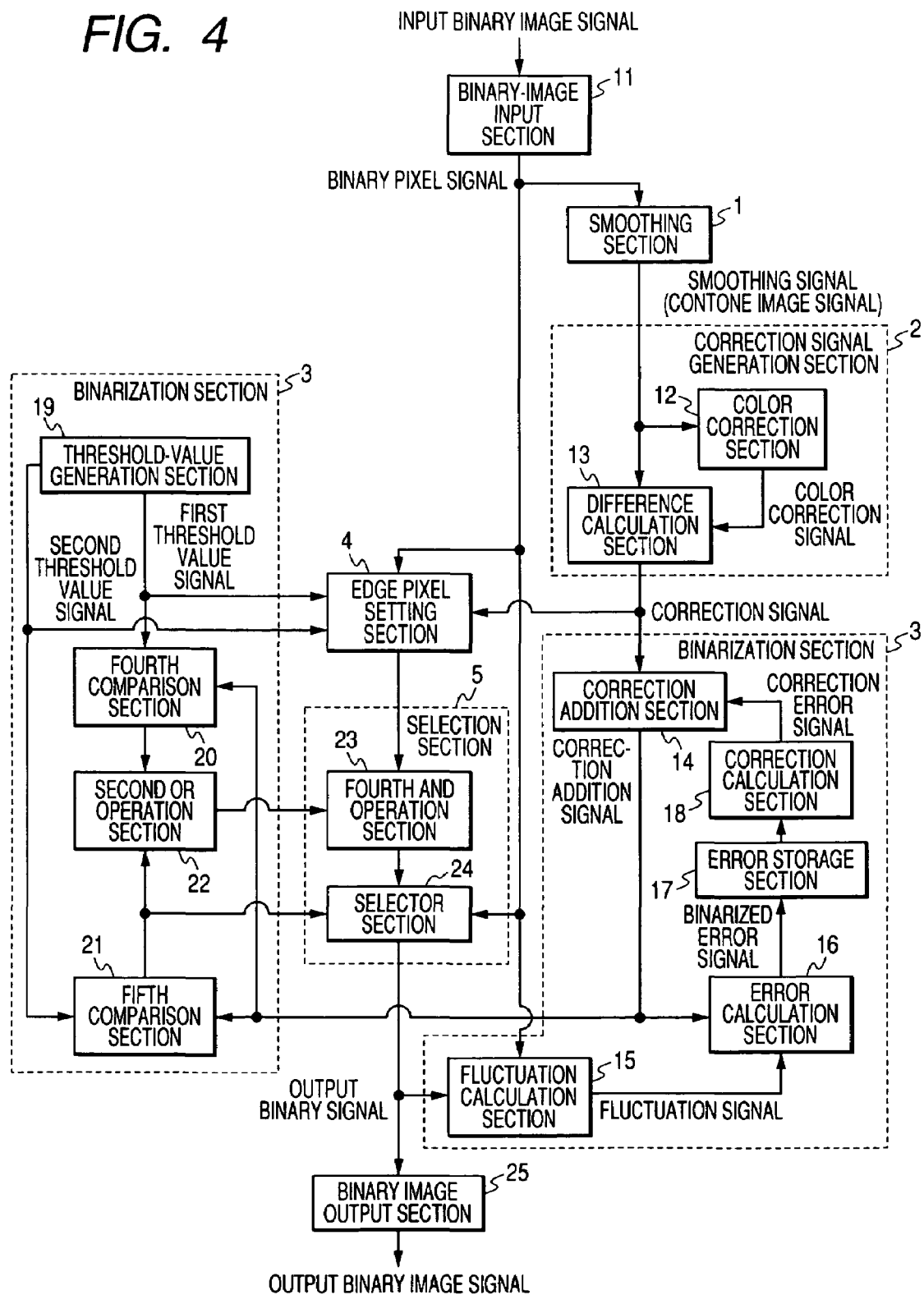
FIG. 4 is a block diagram showing a first specific example of the invention.
Figure 5:
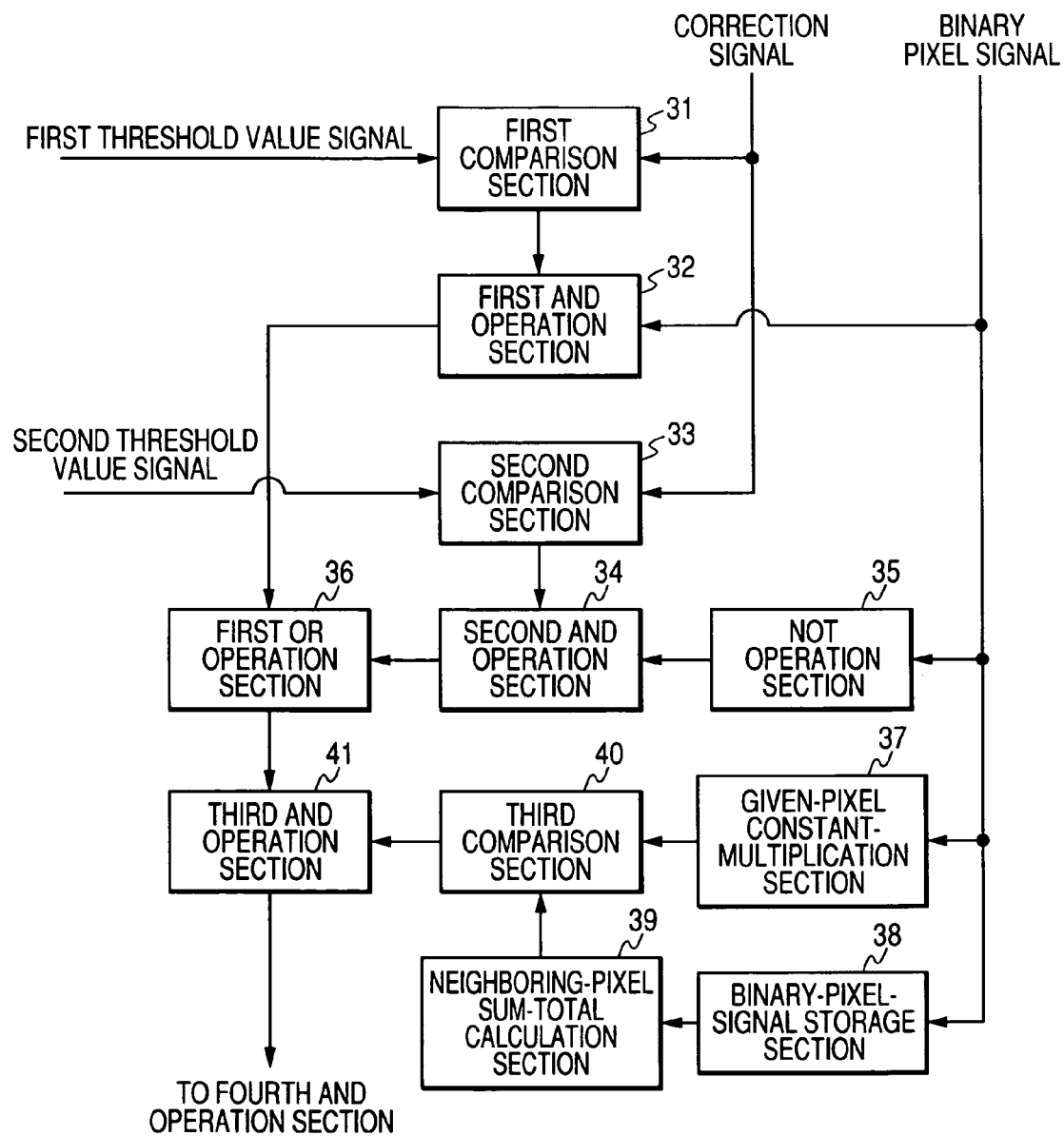
FIG. 5 is a block diagram showing one specific example of an edge pixel setting section.

More specific configurations of one embodiment of the invention are shown. FIG. 4 is a block diagram showing a first specific example of the invention. FIG. 5 is a block diagram showing one specific example of edge pixel setting section. In the figures, numeral 11 denotes a binary-image input section, numeral 12 denotes a color correction section, numeral 13 denotes a difference calculation section, numeral 14 denotes a correction addition section, numeral 15 denotes a fluctuation calculation section, numeral 16 denotes an error calculation section, numeral 17 denotes an error storage section, numeral 18 denotes a correction calculation section, numeral 19 denotes a threshold-value generation section, numeral 20 denotes a fourth comparison section, numeral 21 denotes a fifth comparison section, numeral 22 denotes a second OR operation section, numeral 23 denotes a fourth AND operation section, numeral 24 denotes a selector section, numeral 25 denotes a binary-image output section, numeral 31 denotes a first comparison section, numeral 32 denotes a first AND operation section, numeral 33 denotes a second comparison section, numeral 34 denotes a second AND operation section, numeral 35 denotes a NOT operation section, numeral 36 denotes a first OR operation section, numeral 37 denotes a given-pixel constant-multiplication section, numeral 38 denotes a binary-pixel-signal storage section, numeral 39 denotes a neighboring-pixel sum-total calculation section, numeral 40 denotes a third comparison section, and numeral 41 denotes a third AND operation section. The configuration of the binarization section 3 is separated into the left and right portions in FIG. 4.

In the example shown in FIG. 4, the binary-image input section 11 and the binary-image output section 25 are provided in addition to the components shown in FIG. 1. The binary-image input section 11 receives an input binary image signal and supplies a binary pixel signal, which is a binary signal of a given pixel, to the smoothing section 1, the fluctuation calculation section 15 of the binarization section 3, the edge pixel setting section 4, and the selector section 24 of the selection section 5. In the example, the binary pixel signal is also supplied to the binarization section 3 because the binary pixel signal is also used in the binarization section 3 as described later. The binary-image output section 25 receives an output binary signal output from the selector section 24 of the selection section 5 and supplies the signal as an output binary image signal to a ROS driver, etc., at the following stage if a printer is applied, for example. Of course, the signal output destination is not limited.

The smoothing section 1 performs smoothing processing for the binary pixel signal as described above. The smoothing section 1 receives the binary pixel signal for each pixel from the binary-image input section 11. Therefore, in the example, the smoothing section 1 stores a given pixel and its neighboring pixels of the input binary pixel signal, performs filter calculation using a smoothing filter, and generates a smoothing signal corresponding to a contone image signal. Here, the color correction section 12 in the correction-signal generation section 2 performs color correction processing. Therefore, the smoothing section 1 receives the binary pixel signals of the color components making up a color image, performs smoothing processing with respect to each binary pixel signal to generate color smoothing signals.

In the example, the correction-signal generation section 2 has the color correction section 12 and the difference calculation section 13. The color correction section 12 performs color correction processing for the smoothing signal generated in the smoothing section 1 and generates a color correction signal. For example, the color correction section 12 can perform color correction processing to correct the color reproducibility difference between an output unit assumed when an input binary image signal is generated and an output unit to which an output binary image signal is supplied.

The difference calculation section 13 subtracts the smoothing signal generated in the smoothing section 1 from the color correction signal output from the color correction section 12 to generate a difference signal as a correction signal. This correction signal is supplied to the correction addition section 14 of the binarization section 3 and the edge pixel setting section 4.

In the example, the binarization section 3 includes an error diffusion processing portion having the correction addition section 14, the fluctuation calculation section 15, the error calculation section 16, the error storage section 17, the correction calculation section 18, etc.; and a portion having the threshold-value generation section 19, the fourth comparison section 20, the fifth comparison section 21, and the second OR operation section 22, for binarizing a correction addition signal provided by performing the error diffusion processing.

The correction addition section 14 adds the correction signal generated by the difference calculation section 13 of the correction-signal generation section 2 and a correction error signal calculated by the correction calculation section 18 to generate a correction addition signal. The correction signal, which is a difference signal, can take a positive, zero, or negative value. The correction error signal can also take a positive, zero, or negative value. Thus, the generated correction addition signal can also take a positive, zero, or negative value. The correction addition signal is passed to the fourth comparison section 20 and the fifth comparison section 21 and is binarized. The correction addition signal is also passed to the error calculation section 16 and is used to calculate an error.

The fluctuation calculation section 15 subtracts the binary pixel signal output by the binary-image input section 11 from the output binary signal selected in the selector section 24 of the selection section 5 to find fluctuation of the pixel value, and supplies a fluctuation signal to the error calculation section 16. Since each of the output binary signal and the binary pixel signal takes a value of 0 or 1, the fluctuation signal takes a value of −1, 0, or 1. Of course, a quantization level may be assigned to each of the fluctuation signals for conversion into a contone signal. For example, the converted fluctuation signal may take −255, 0, or 255.

The error calculation section 16 receives the fluctuation signal calculated by the fluctuation calculation section 15. If the fluctuation signal takes a value of −1, 0, or 1, for example, the error calculation section 16 assigns a quantization level (for example, −255, 0, 255, etc.,) to the fluctuation signal and then subtracts the quantization level of the fluctuation signal from the correction addition signal supplied from the correction addition section 14 to generate a binarization error signal.

The error storage section 17 stores the binarization error signal generated by the error calculation section 16 and supplies the binarization error signal to the correction calculation section 18.

The correction calculation section 18 uses the binarization error signal stored in the error storage section 17 to calculate a correction error signal required for the given pixel next to the current given pixel. The correction calculation section 18 calculates the correction error signal by performing sum of products operation with respect to an error diffusion coefficient and the quantization error signal corresponding to one or more already processed pixels that surround the next given pixel are stored in the error storage section 17, for example.

The threshold-value generation section 19 generates a first threshold signal and a second threshold signal for binarizing the correction addition signal. The correction addition signal output from the correction addition section 14 can take a positive, zero, or negative value as described above. In the embodiment, two threshold signals are generated for separating the correction addition signal into three areas of a zero area containing 0, a positive area taking a larger value than the zero area, and a negative area taking a smaller value than the area containing 0. The first threshold signal is a threshold signal for separating the negative area and other areas. The second threshold signal is a threshold signal for separating the positive area and other areas. Here, the first threshold signal is set to 0 and the second threshold signal is set to 1 by way of example. Of course, the values of the first threshold signal and the second threshold signal are not limited to them. However, is the relationship between the two threshold signals, the interval is only 1 such as 0 and 1 or 127 and 128 and a command is given so as not to set a pixel assumed to be an edge in the interval (zero area) as described later. Therefore, a problem of dot generation delay, that is a general problem in the error diffusion method, can be lessened. In contrast, when the distance between the first threshold signal and the second threshold signal is increased, an area in which the original input binary image signal is output intact can be enlarged if the absolute value of color correction is increased. Therefore, noise resistance is enhanced. The interval between the first threshold signal and the second threshold signal becomes a trade off therebetween. In the example, the first threshold signal (value 0) and the second threshold signal (value 1) are also used in the edge pixel setting section 4.

The fourth comparison section 20 makes a comparison between the correction addition signal and the first threshold signal. When the correction addition signal is smaller than the first threshold signal, the fourth comparison section 20 outputs 1; when the correction addition signal is equal to or greater than the first threshold signal, the fourth comparison section 20 outputs 0. Accordingly, when the correction addition signal is in the negative area, 1 is output; otherwise, 0 is output.

The fifth comparison section 21 makes a comparison between the correction addition signal and the second threshold signal. When the correction addition signal is equal to or greater than the second threshold signal, the fifth comparison section 21 outputs 1; when the correction addition signal is less than the second threshold signal, the fifth comparison section 21 outputs 0. Accordingly, when the correction addition signal is in the positive area, 1 is output; otherwise, 0 is output. In the example, the output of the fifth comparison section 21 is used as a correction binary signal for correcting the input binary image signal.

The second OR operation section 22 ORs the outputs of the fourth comparison section and the fifth comparison section. As a result, when the correction addition signal is in the positive or negative area, 1 is output; when the correction addition signal is in the zero area, 0 is output. The output of the second OR operation section 22 is passed to the fourth AND operation section 23 so as to reset output from the edge pixel setting section 4 to 0 when the correction addition signal is in the zero area. This means that if the correction addition signal has a value of 0 or near 0, an error scarcely occurs and thus the binary pixel signal is output intact.

In the general error diffusion method, black pixels are only placed in a white image. In the example, the result of diffusing an error to an input binary image signal containing black and white pixels is reflected. In the positive area, a black pixel may be placed as usual; in the negative area, a white pixel may be placed. In either case, the correction addition signal may be replaced with a binarized signal (in the example, the output signal of the fifth comparison section). It is considered that an error needs not be reflected in the zero area. Thus, the binary pixel signal is retained intact and the fourth AND operation section 23 is instructed to release setting of assuming to be an edge.

As shown in FIG. 5, the edge pixel setting section 4 may include the first comparison section 31, the first AND operation section 32, the second comparison section 33, the second AND operation section 34, the NOT operation section 35, the first OR operation section 36, the given-pixel constant-multiplication section 37, the binary-pixel-signal storage section 38, the neighboring-pixel sum-total calculation section 39, the third comparison section 40, and the third AND operation section 41. The first comparison section 31, the first AND operation section 32, the second comparison section 33, the second AND operation section 34, the NOT operation section 35, and the first OR operation section 36 determine whether or not the pixel is assumed to be an edge if the presence of an edge is detected in the given pixel from the relationship between the correction signal and the binary pixel signal. The given-pixel constant-multiplication section 37, the binary-pixel-signal storage section 38, the neighboring-pixel sum-total calculation section 39, and the third comparison section 40 detect the presence of an edge. The third AND operation section 41 finally determines whether or not the given pixel is assumed to be an edge.

The binary pixel signal is supplied to the first AND operation section 32, the NOT operation section 35, the given-pixel constant-multiplication section 37, and the binary-pixel-signal storage section 38. The correction signal is supplied to the first comparison section 31 and the second comparison section 33. Further, the first threshold signal and the second threshold signal are supplied to the first comparison section 31 and the second comparison section 33, respectively. In the example, the first threshold signal and the second threshold signal used in the fourth comparison section 20 and the fifth comparison section 21 of the binarization section 3 are used. Of course, however, threshold signals used in the first comparison section 31 and the second comparison section 33 may be generated additionally.

Like the fourth comparison section 20 and the fifth comparison section 21 of the binarization section 3 described above, the first comparison section 31 and the second comparison section 33 make a comparison to categorize the correction signal into three areas of a zero area containing 0, a positive area taking a larger value than the zero area, and a negative area taking a smaller value than the zero area.

The first comparison section 31 makes a comparison between the correction signal and the first threshold signal. When the correction signal is smaller than the first threshold signal, the first comparison section 31 outputs 1; when the correction signal is equal to or greater than the first threshold signal, the first comparison section 31 outputs 0. Accordingly, when the correction signal is in the negative area, 1 is output; otherwise, 0 is output. The second comparison section 33 makes a comparison between the correction signal and the second threshold signal. When the correction signal is equal to or greater than the second threshold signal, the second comparison section 33 outputs 1; when the correction signal is less than the second threshold signal, the second comparison section 33 outputs 0. Accordingly, when the correction signal is in the positive area, 1 is output; otherwise, 0 is output.

The first AND operation section 32 ANDs the output of the first comparison section 31 and the binary pixel signal together. Therefore, when the correction signal of the given pixel takes a value in the negative area and the binary pixel signal is 1, 1 is output in combination with the first comparison section 31. That is, when the color correction section 12 outputs the correction result of lessening the pixel value of the smoothing signal, which is a contone image signal, and the binary pixel signal is black, a signal of 1 is sent to the first OR operation section 36. The given pixel as 1 is output is a pixel assumed to be an edge if the presence of an edge is detected.

The NOT operation section 35 inverts the value of the binary pixel signal. That is, if the binary pixel signal is a black pixel, the NOT operation section 35 outputs 0; if the binary pixel signal is a white pixel, the NOT operation section 35 outputs 1 to the following second AND operation section 34 to perform AND operation.

The second AND operation section 34 ANDs the output of the second comparison section 33 and the binary pixel signal inverted by the NOT operation section 35. Therefore, when the correction signal of the given pixel takes a value in the positive area and the inversion signal of the binary pixel signal is 1, 1 is output in combination with the second comparison section 33. That is, when the color correction section 12 outputs the correction result of increasing the pixel value of the smoothing signal, which is a contone image signal, and the binary pixel signal is white, a signal of 1 is sent to the first OR operation section 36. The given pixel as 1 is output is a pixel assumed to be an edge if the presence of an edge is detected.

If the result of the first AND operation section 32 is 1 or the result of the second AND operation section 34 is 1, the first OR operation section 36 sends a signal of 1 to the third AND operation section 41; otherwise, the first OR operation section 36 sends a signal of 0. The output signal of the first OR operation section 36 indicates whether or not the given pixel is assumed to be an edge if the presence of an edge is detected in the given pixel.

Figures 6, 7:
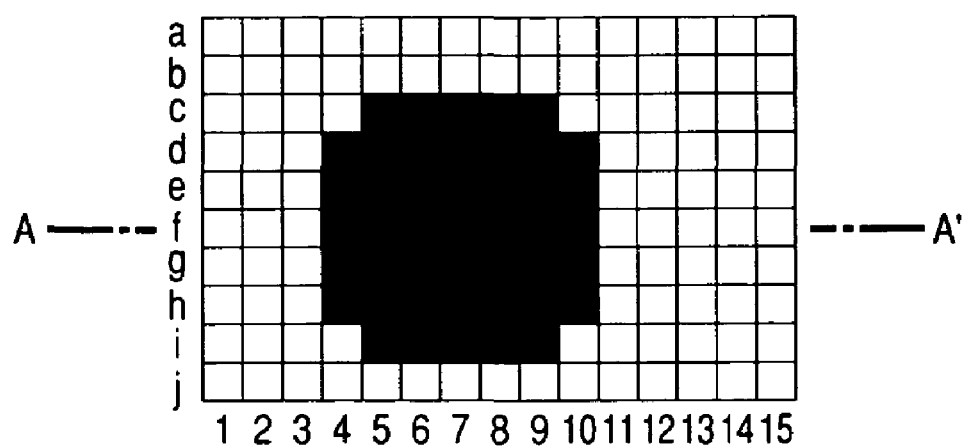
FIG. 6 is a schematic representation of an example of the conditions for assuming a given pixel to be an edge.
FIG. 7 is a schematic representation of a specific example of the operation in the first specific example of the invention.

FIG. 6 is a schematic representation of an example of the conditions for assuming the given pixel to be an edge. The output of the first OR operation section 36, namely, the determination conditions of the first comparison section 31 and the first AND operation section 32; and the second comparison section 33, the second AND operation section 34, and the NOT operation section 35 are summarized as shown in FIG. 6. That is, the difference calculation section 13 calculates a difference between the contone image signals before and after subjected to color correction. If a correction signal for lessening the contone image signal is output based on the difference, the correction signal is in the negative area. That is, the first comparison section 31 outputs 1. In this case, if the binary pixel signal is 1 (black), the first AND operation section 32 outputs 1. This is the case where a circle is put in the lower right field in FIG. 6.

If a correction signal for increasing the contone image signal is output based on the difference calculated by the difference calculation section 13, the correction signal is in the positive area. That is, the second comparison section 33 outputs 1. In this case, if the binary pixel signal is 0 (white), the second AND operation section 34 outputs 1. This is the case where a circle is put in the upper left field in FIG. 6.

In the two cases described above, the first OR operation section 36 outputs 1; in other cases, the first OR operation section 36 outputs 0. At the point in time, whether or not an edge exists in the given pixel has not been determined and therefore the output signal of the first OR operation section 36 is not a signal for assuming the given pixel to be an edge. If the presence of an edge is detected in the given pixel in the configuration for detecting the presence of an edge described just below, the given pixel is assumed to be an edge.

Referring again to FIGS. 4 and 5, the given-pixel constant-multiplication section 37 multiplies the binary pixel signal by number of pixels used for calculation in the neighboring-pixel sum-total calculation section 39. The binary-pixel-signal storage section 38 stores the binary pixel signal for the neighboring-pixel sum-total calculation section 39 to reference and calculate the pixels surrounding the given pixel. The neighboring-pixel sum-total calculation section 39 reads the values of predetermined neighboring pixels not containing the given pixel from the binary-pixel-signal storage section 38 and calculates the sum total of the values.

The third comparison section 40 makes a comparison between the output of the given-pixel constant-multiplication section 37 and the output of the neighboring-pixel sum-total calculation section 39. When the values differ, the third comparison section 40 outputs 1; when the values equal, the third comparison section 40 outputs 0. For example, if the values of the given pixel and every neighboring pixel equal, the sum total of the neighboring pixels is equal to the value resulting from multiplying the value of the given pixel by the number of the neighboring pixels. However, if one of the neighboring pixels has a value different from the value of the given pixel, the sum total of the neighboring pixels is not equal to the value resulting from multiplying the value of the given pixel by the number of the neighboring pixels. If one of the neighboring pixels has a value different from the value of the given pixel, it means that an edge exists. Therefore, if an edge exists on the periphery of the given pixel, the third comparison section 40 outputs 1; if no edge exists, the third comparison section 40 outputs 0. This can provide an equal effect to the case where a Laplacian filter is applied to the binary pixel signal to detect an edge using the given pixel constant-multiplication section 37, the neighboring-pixel sum-total calculation section 39, and the third comparison section 40 in combination.

To make a determination using the given pixel x and the pixels pqrs above and below and at the right and left of the given pixel x, for example, as shown in FIG. 2B, the given pixel constant-multiplication section 37 multiplies the value of the given pixel x by four and the neighboring-pixel sum-total calculation section 39 performs the operation of p+q+r+s. The third comparison section 40 compares the operation results and determines whether or not 4x=p+q+r+s.

The detection method of the presence of an edge may be any arbitral method. The presence of an edge may be detected according to any other configuration than the combination of the given pixel constant-multiplication section 37, the neighboring-pixel sum-total calculation section 39, and the third comparison section 40.

The third AND operation section 41 ANDs the output of the first OR operation section 36 and the output of the third comparison section 40 together. When the third comparison section 40 outputs 1, that is, an edge is detected and the first AND operation section 32 or the second AND operation section 34 outputs 1, the third AND operation section 41 outputs 1. The output of the first OR operation section 36 indicates whether or not the given pixel is set as a pixel assumed to be an edge if the presence of an edge is detected. The output of the third comparison section 40 indicates whether or not an edge exists, as described above. Therefore, the output of the third AND operation section 41 is as follows: If the presence of an edge is detected and the color correction section 12 increases the pixel value of the contone image signal, the pixel on the white side of the edge is assumed to be the edge to be processed and is set; if the presence of an edge is detected and the color correction section 12 lessens the pixel value of the contone image signal, the pixel on the black side of the edge is assumed to be the edge to be processed and is set. Accordingly, pixels on opposite sides with respect to the detected edge are set as the edge to be processed in a case where the color correction section 12 makes a correction so as to increase the contone image signal; and in a case where the color correction section 12 makes a correction so as to lessen the contone image signal, respectively.

The selection section 5 includes the fourth AND operation section 23 and the selector section 24. The fourth AND operation section 23 ANDs the output from the edge pixel setting section 4 (third AND operation section 41) and the output of the second OR operation section 22 of the binarization section 3. When the third AND operation section 41 outputs 1, that is, the given pixel is set as a pixel assumed to be an edge and the correction addition signal has a value in the negative area less than the first threshold value or a value in the positive area equal to or greater than the second threshold value, the fourth AND operation section 23 outputs 1 to inform the selector section 24 that the given pixel is set as a pixel assumed to be an edge. However, although the third AND operation section 41 outputs 1, that is, the given pixel is set as a pixel assumed to be an edge, if the correction addition signal has a value in the zero area equal to or greater than the first threshold value and less than the second threshold value, the fourth AND operation section 23 outputs 0 to inform the selector section 24 that the given pixel is not a pixel assumed to be an edge. If the correction addition signal has a value in the zero area, it can be considered that correction needs not be made. In this case, to skip the given pixel, the fourth AND operation section 23 outputs 0.

The selector section 24 selects the binary pixel signal or the output of the fifth comparison section 21 according to the output result of the fourth AND operation section 23, and outputs an output binary signal. That is, depending on whether or not the pixel is a pixel assumed to be an edge to be processed, if the pixel is assumed to be an edge, the result of binarizing the correction addition signal is selected; otherwise, the input binary pixel signal is selected and is output intact.

Thus, the result of the correction processing performed for the contone image signal by the color correction section 12 can be reflected on the input binary pixel signal. That is, correction processing having a similar effect to that of the correction processing performed for the contone image signal can be performed for the input binary pixel signal. At this time, for the edge of each cluster of halftone dots, the binary data of the correction signal is made to act on the white pixel side if a correction is made for increasing the value or on the black pixel side if a correction is made for lessening the value. Therefore, the correction can be made with the shape of the cluster almost held and an output binary image signal of high image quality can be provided.

FIG. 7 is a schematic representation of a specific example of the operation in the first specific example of the invention. An outline of the operation when a halftone image similar to that in the example shown in FIG. 2A is input as an input binary image signal will be discussed. Here, described will be a case where one line of A-A' in the figure is processed with using pixels f1 to f15 as the given pixels in order and using the pixels pqrs shown in FIG. 2B as the neighboring pixels. At this time, the presence of an edge is detected in the pixels f3, f4, f10, and f11.

To begin with, the case where the color correction section 12 makes a correction for lessening the value of a contone image signal in f1 to f15 will be discussed. Here, it is assumed that the contone image signal after the correction is made is decremented by 2 and that −2 is output as a correction signal.

When f1 and f2 become the given pixels, the presence of an edge is not detected and thus the edge pixel setting section 4 outputs 0. Therefore, the fourth AND operation section 23 also outputs 0, causing the selector section 24 to select the binary pixel signal as an output binary signal. Therefore, the binary pixel signal is output intact. Meanwhile, the fluctuation calculation section 15 outputs 0. However, since the correction signal is −2, the correction addition signal is −2 in f1 and the error calculation section 16 outputs −2 as a binarization error signal. This binarization error signal is stored in the error storage section 17 with being associated with f2. In f2, the correction calculation section 18 calculates an error from the already processed pixels surrounding f2. For example, if the correction error signal is calculated as −1, the correction addition section 14 adds this value −1 to the value −2 of the correction signal and outputs −3 as a correction addition signal. Also in this case, the correction addition signal intact is stored in the error storage section 17 as the binarization error signal corresponding to f2.

When f3 becomes the given pixel, the components of the given pixel constant-multiplication section 37 to the third comparison section 40 in the edge pixel setting section 4 detect the presence of an edge. Then, the third comparison section 40 inputs 1 to the third AND operation section 41. The color correction section 12 also makes a correction for lessening the value of the contone image signal. Since the correction signal is −2 (negative value), the first comparison section 31 inputs 1 to the first AND operation section 32. However, since the binary pixel signal is 0, the first AND operation section 32 outputs 0. The second AND operation section 34 also outputs 0. Therefore, the first OR operation section 36 outputs 0. Consequently, f3 is not assumed to be an edge. Accordingly, the fourth AND operation section 23 outputs 0, causing the selector section 24 to select the binary pixel signal and output it as an output binary signal. Also in this case, although the fluctuation calculation section 15 outputs 0, the correction addition signal −3 is stored in the error storage section 17 as the binarization error signal corresponding to f3.

When f4 becomes the given pixel, the components of the given pixel constant-multiplication section 37 to the third comparison section 40 in the edge pixel setting section 4 detect the presence of an edge. Then, the third comparison section 40 inputs 1 to the third AND operation section 41. The color correction section 12 also makes a correction for lessening the value of the contone image signal. Since the correction signal is −2 (negative value), the first comparison section 31 inputs 1 to the first AND operation section 32. Further, since the binary pixel signal is 1, the first AND operation section 32 outputs 1. As a result, the first OR operation section 36 also outputs 1. Since both the first OR operation section 36 and the third comparison section 40 output 1, the third AND operation section 41 outputs 1 to set the pixel f4 as a pixel assumed to be an edge.

When −1, for example, is output from the correction calculation section 18 as the correction error signal corresponding to f4, the correction addition section 14 adds the correction signal to the correction error signal and outputs −3 as a correction addition signal. The fourth comparison section 20 makes a comparison between the correction addition signal and the first threshold signal and the fifth comparison section 21 makes a comparison between the correction addition signal and the second threshold signal. The fourth comparison section 20 outputs 1, so that the second OR operation section 22 outputs 1. Therefore, the fourth AND operation section 23 outputs 1 because both the third AND operation section 41 and the second OR operation section 22 output 1, thus causing the selector section 24 to select 0 output by the fifth comparison section 21 to output 0 as an output binary signal. Accordingly, the binary pixel signal of black is replaced with white.

The fluctuation calculation section 15 subtracts the binary pixel signal (1) from the output binary signal (0) and passes −1 to the error calculation section 16 as a fluctuation signal of f4. The error calculation section 16 replaces the fluctuation signal with a quantization level, for example, replaces −1 with −255, etc., and subtracts the value from the correction addition signal (−3). Accordingly, 252 is obtained as a binarization error signal. This value is stored in the error storage section 17 as the binarization error signal corresponding to f4.

When f5 to f9 become the given pixels, the presence of an edge is not detected and thus the edge pixel setting section 4 outputs 0. Therefore, the fourth AND operation section 23 also outputs 0, causing the selector section 24 to select the binary pixel signal as an output binary signal. Therefore, the binary pixel signal intact is output. Meanwhile, for each of the pixels f5 to f9, a binarization error signal is calculated and is stored in the error storage section 17.

When f10 becomes the given pixel, as with f4, the edge pixel setting section 4 (third AND operation section 41) outputs 1 and f10 is set as a pixel assumed to be an edge.

It is assumed that 2, for example, is output from the correction calculation section 18 as the correction error signal corresponding to f10. At this time, the correction addition section 14 adds the correction signal to the correction error signal and outputs 0 as a correction addition signal. The fourth comparison section 20 makes a comparison between the correction addition signal and the first threshold signal and the fifth comparison section 21 makes a comparison between the correction addition signal and the second threshold signal. In this case, both the fourth comparison section 20 and the fifth comparison section 21 output 0. As a result, the second OR operation section 22 outputs 0. Therefore, the fourth AND operation section 23 outputs 0 even if the third AND operation section 41 outputs 1. That is, the pixel f10 is placed out of the pixels assumed to be an edge. This is because the correction addition signal is 0, that is, no error occurs, so that correction need not be made. Thus, the selector section 24 selects the binary pixel signal and outputs it as an output binary signal. Accordingly, the binary pixel signal of black intact is output.

In this case, the fluctuation calculation section 15 outputs 0 and the correction addition signal is 0. Thus, the binarization error signal calculated by the error calculation section 16 is also 0, which is then stored in the error storage section 17.

When f11 becomes the given pixel, as with f3, the components of the given pixel constant-multiplication section 37 to the third comparison section 40 in the edge pixel setting section 4 detect the presence of an edge, but the first OR operation section 36 outputs 0. Therefore, f11 is not assumed to be an edge. Accordingly, the fourth AND operation section 23 outputs 0, causing the selector section 24 to select the binary pixel signal for output as an output binary signal. Also in this case, although the fluctuation calculation section 15 outputs 0, the correction addition signal is stored in the error storage section 17 as the binarization error signal corresponding to f11.

For f12 to f15, the presence of an edge is not detected. Thus, the binary pixel signal intact is output as an output binary signal. With regard to these pixels f12 to f15, the correction addition signal is stored in the error storage section 17 as the binarization error signal.

In the case where the color correction section 12 thus makes the correction for lessening the value of the contone image signal, if an edge exists, black pixel is replaced with the binary signal generated by the error diffusion method from the correction signal and the correction processing result of the color correction section 12 can be reflected on the input binary image signal to provide the output binary image signal. At this time, the correction is only made so as to lessen the edge portion of the cluster of halftone dots, so that the shape of the cluster can be almost maintained and degradation of the image quality for the whole image can be suppressed for providing an output binary image signal of high image quality.

Next, the case where the color correction section 12 makes a correction for increasing the value of a contone image signal in f1 to f15 will be discussed. Here, it is assumed that the contone image signal after the correction is made is incremented by 2, and 2 is output as a correction signal. Similar parts to those in the case where a correction is made for lessening the value of a contone image signal previously described will not be discussed again in detail whenever necessary.

When f1 and f2 become the given pixels, the presence of an edge is not detected. Thus, the selector section 24 selects the binary pixel signal as an output binary signal. Therefore, the binary pixel signal intact is output. Meanwhile, the fluctuation calculation section 15 outputs 0. Thus, the correction addition signal is stored in the error storage section 17 as the binarization error signal corresponding to f1, f2.

When f3 becomes the given pixel, the components of the given pixel constant-multiplication section 37 to the third comparison section 40 in the edge pixel setting section 4 detect the presence of an edge, and the third comparison section 40 inputs 1 to the third AND operation section 41. The color correction section 12 also makes a correction for increasing the value of the contone image signal. Since the correction signal is 2 (positive value), the second comparison section 33 inputs 1 to the second AND operation section 34. Further, the binary pixel signal is 0 and is inverted by the NOT operation section 35, and 1 is input to the second AND operation section 34. Therefore, the second AND operation section 34 outputs 1, so that the first OR operation section 36 also outputs 0. Since both the first OR operation section 36 and the third comparison section 40 output 1, the third AND operation section 41 outputs 1, setting the pixel f3 as an edge pixel assumed to be an edge.

When 1, for example, is output from the correction calculation section 18 as the correction error signal corresponding to f3, the correction addition section 14 adds the correction signal to the correction error signal and outputs 3 as a correction addition signal. The fourth comparison section 20 makes a comparison between the correction addition signal and the first threshold signal and the fifth comparison section 21 makes a comparison between the correction addition signal and the second threshold signal. Then, the fifth comparison section 21 outputs 1. The second OR operation section 22 outputs 1. Therefore, the fourth AND operation section 23 outputs 1 because both the third AND operation section 41 and the second OR operation section 22 output 1, thus causing the selector section 24 to select 1 output by the fifth comparison section 21 and output 1 as an output binary signal. Accordingly, the binary pixel signal of white is replaced with black.

The fluctuation calculation section 15 subtracts the binary pixel signal (0) from the output binary signal (1) and passes 1 to the error calculation section 16 as a fluctuation signal of f3. The error calculation section 16 replaces the fluctuation signal with a quantization level, for example, replaces 1 with 255, etc., and subtracts this value 255 from the correction addition signal (3). Accordingly, −252 is obtained as a binarization error signal. This value is stored in the error storage section 17 as the binarization error signal corresponding to f3.

When f4 becomes the given pixel, the components of the given pixel constant-multiplication section 37 to the third comparison section 40 in the edge pixel setting section 4 detect the presence of an edge. Then, the third comparison section 40 inputs 1 to the third AND operation section 41. Although the second comparison section 33 outputs 1 because the correction signal is 2 (positive), the binary pixel signal is 1. Thus, the binary pixel signal of 1 is inverted by the NOT operation section 35 and 0 is input to the second AND operation section 34, which then outputs 0. The first AND operation section 32 also outputs 0, causing the first OR operation section 36 to output 0. Consequently, the pixel f4 is not assumed to be an edge. Accordingly, the fourth AND operation section 23 outputs 0, causing the selector section 24 to select the binary pixel signal as an output binary signal. Also in this case, the fluctuation calculation section 15 outputs 0, but the correction addition signal is stored in the error storage section 17 as the binarization error signal corresponding to f4.

When f5 to f9 become the given pixels, the presence of an edge is not detected and thus the edge pixel setting section 4 outputs 0. Therefore, the fourth AND operation section 23 also outputs 0, causing the selector section 24 to select the binary pixel signal as an output binary signal. Therefore, the binary pixel signal intact is output. Meanwhile, with regard to each of these pixels f5 to f9, the correction addition signal is stored in the error storage section 17 as the binarization error signal.

When f10 becomes the given pixel, as with f4, the components of the given pixel constant-multiplication section 37 to the third comparison section 40 in the edge pixel setting section 4 detect the presence of an edge, but the pixel f10 is not assumed to be an edge because the first OR operation section 36 outputs 0. Accordingly, the fourth AND operation section 23 outputs 0, causing the selector section 24 to select the binary pixel signal as an output binary signal. Also in this case, the fluctuation calculation section 15 outputs 0. However, the correction addition signal is stored in the error storage section 17 as the binarization error signal corresponding to f11.

When f11 becomes the given pixel, as with f3, the edge pixel setting section 4 (third AND operation section 41) outputs 1 and f11 is set as an edge pixel assumed to be an edge.

It is assumed that −3, for example, is output from the correction calculation section 18 as the correction error signal corresponding to f11. At this time, the correction addition section 14 adds the correction signal to the correction error signal and outputs −1 as a correction addition signal. The fourth comparison section 20 makes a comparison between the correction addition signal and the first threshold signal and the fifth comparison section 21 makes a comparison between the correction addition signal and the second threshold signal. In this case, the fourth comparison section 20 outputs 1 and the fifth comparison section 21 outputs 0, so that the second OR operation section 22 outputs 1. Therefore, the fourth AND operation section 23 outputs 1 because both of the third AND operation section 41 and the second OR operation section 22 output 1. Accordingly, the selector section 24 selects the output of the fifth comparison section 21 (0) to output it as an output binary signal.

In this case, as the internal processing, the binary pixel signal is replaced with the binary signal provided by processing the difference signal by the error diffusion method. However, since the replaced pixel is white, the output binary signal is substantially the same as the binary pixel signal. The fluctuation calculation section 15 outputs 0, so that the correction addition signal is stored in the error storage section 17 as the binarization error signal corresponding to f11.

For f12 to f15, the presence of an edge is not detected. Thus, the binary pixel signal intact is output as an output binary signal. For the pixels, the correction addition signal is stored in the error storage section 17 as the binarization error signal.

In the case where the color correction section 12 thus makes the correction for increasing the value of the contone image signal, if an edge exists, white pixel is replaced with the binary signal generated by the error diffusion method from the correction signal. Accordingly, the correction processing result of the color correction section 12 can be reflected on the input binary image signal to provide the output binary image signal. At this time, the correction is only made so as to increase the edge portion of the cluster of halftone dots, so that the shape of the cluster can be almost maintained and degradation of the image quality for the whole image can be suppressed for providing an output binary image signal of high image quality.

Figure 8:
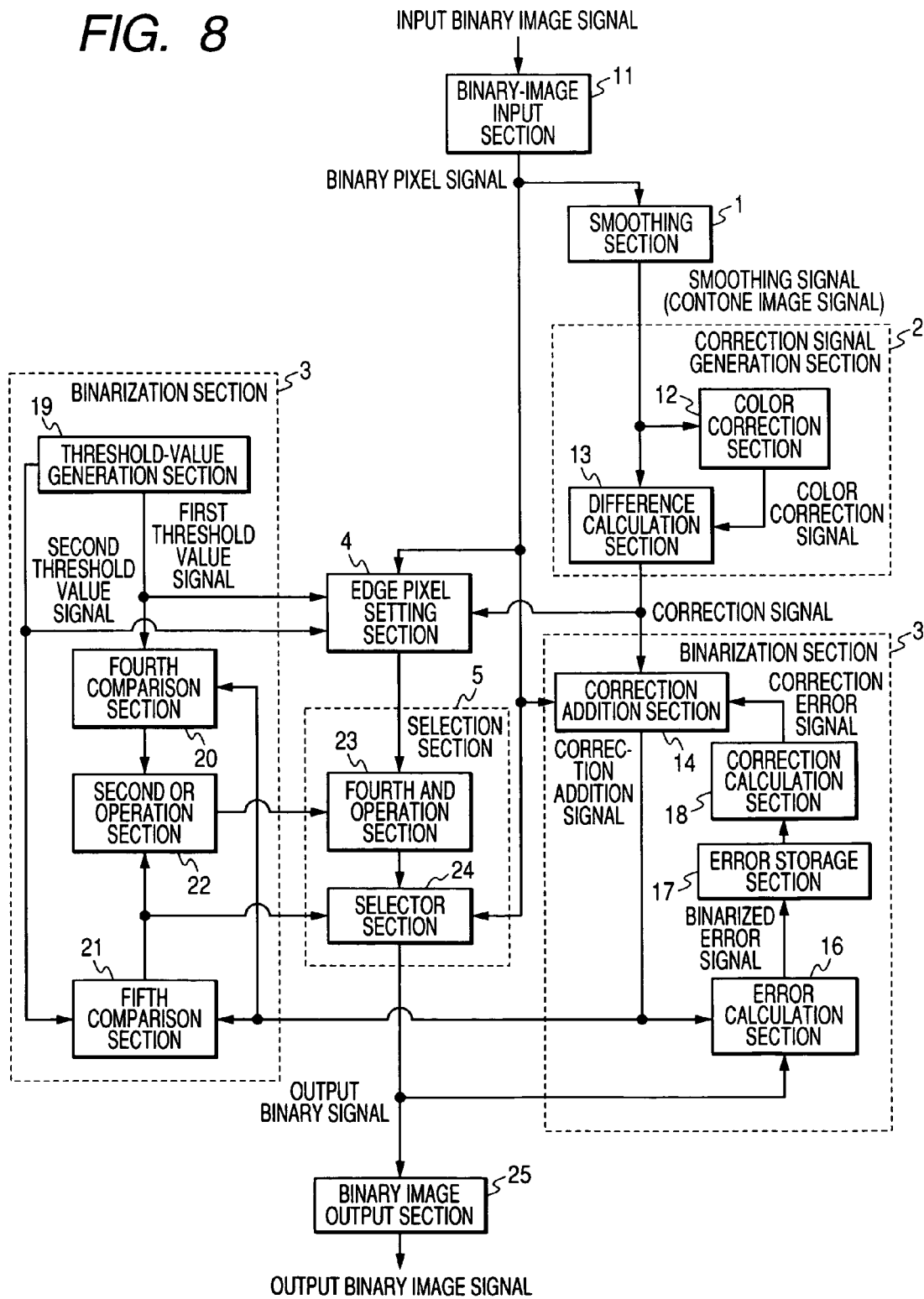
FIG. 8 is a block diagram to show a second specific example of the invention.

FIG. 8 is a block diagram to show a second specific example of the invention. Parts similar to those previously described with reference to FIG. 4 are denoted by the same reference numerals in FIG. 8 and will not be discussed again. The second specific example differs from the first specific example in configuration for implementing error diffusion method in binarization section 3. That is, in the second specific example, no fluctuation calculation section 15 is provided, and a correction addition section 14 uses a binary pixel signal to generate a correction addition signal.

The correction addition section 14 receives a binary pixel signal and assigns a quantization level thereto. For example, if the binary pixel signal is 0, 0 may be assigned. If the binary pixel signal is 1, 255 may be assigned. The correction addition section 14 adds the quantization level, a correction signal output from the difference calculation section 13 of the correction-signal generation section 2, and a correction error signal output from the correction calculation section 18 and outputs the result as a correction addition signal.

The error calculation section 16 assigns a quantization level to an output binary signal. For example, if the output binary signal is 0, 0 may be assigned. If the output binary signal is 1, 255 may be assigned. The error calculation section 16 subtracts the quantization level from the correction addition signal to generate a binarization error signal and stores the binarization error signal in an error storage section 17.

In the second specific example, the quantization level of the binary pixel signal is added to the correction addition signal. Therefore, when the fourth comparison section 20 and the fifth comparison section 21 make the comparison, values such as 127 and 128 are set as the first and second threshold values. In this case, the values may be set separately from the threshold value used in an edge pixel setting section 4. Alternatively, the first and second threshold values may be preset to 0 and 1, and 127 may be added thereto in the fourth comparison section 20 and the fifth comparison section 21.

Also in the configuration of the second specific example, the value of the correction addition signal may differ, but the apparatus in the second specific example operates like that in the first specific example described above. When making a correction so as to increase a contone image signal, pixels are placed by the error diffusion method on the white pixel side of an edge; and when making a correction so as to lessen a contone image signal, pixels are placed by the error diffusion method on the black pixel side of an edge. Thereby, the correction processing can be performed with respect to the input binary image signal. At this time, the shape of the cluster of halftone dots is almost maintained, so that an output binary image signal of high image quality can be provided.

Figure 9:
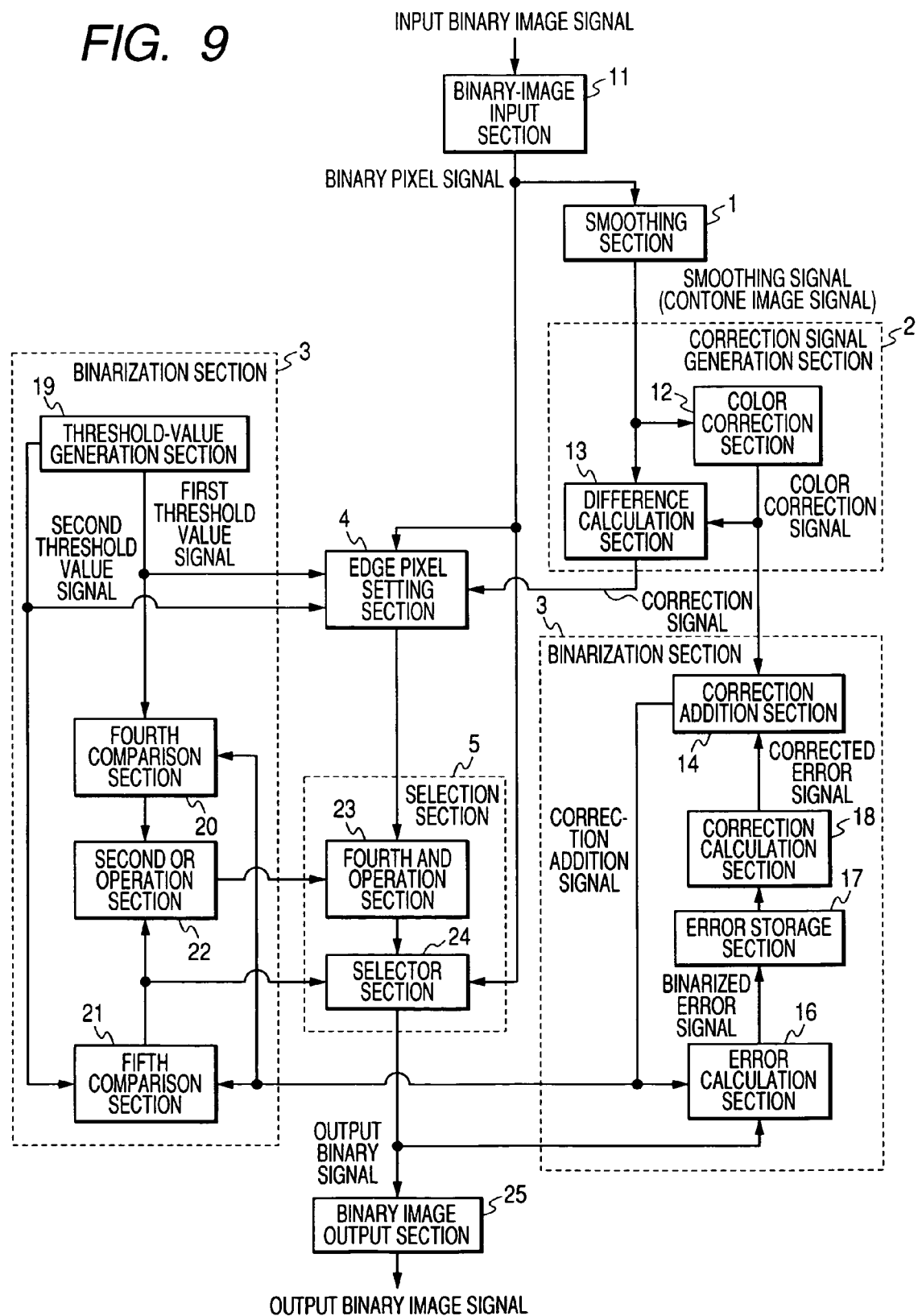
FIG. 9 is a block diagram to show a third specific example of the invention.

FIG. 9 is a block diagram to show a third specific example of the invention. Parts similar to those previously described with reference to FIG. 4 are denoted by the same reference numerals in FIG. 9 and will not be discussed again. In the first and second specific examples described above, when the error diffusion method is applied, the correction signal output from the difference calculation section 13 is used to generate the correction binary signal for correction by the error diffusion method. In the third specific example, the error diffusion method is implemented using a color correction signal, which is a contone image signal subjected to color correction processing by the color correction section 12 in the binarization section 3.

The correction addition section 14 receives a color correction signal from the color correction section 12, adds the color correction signal to a correction error signal output from a correction calculation section 18, and outputs the result as a correction addition signal. The error calculation section 16 assigns a quantization level (for example, 0 if an output binary signal is 0 or 255 if 1) to an output binary signal, subtracts the quantization level from the correction addition signal to generate a binarization error signal, and stores the binarization error signal in an error storage section 17. Also in this example, the first and second threshold values may be generated as 127 and 128 separately from the threshold value used in an edge pixel setting section 4. Alternatively, 127 may be added to the first and second threshold values in the fourth comparison section 20 and the fifth comparison section 21.

Also in the configuration of the third specific example, the value of the correction addition signal may differ, but the apparatus in the second specific example operates like that in the first specific example described above. When making a correction so as to increase a contone image signal, pixels are placed by the error diffusion method on the white pixel side of an edge; and when making a correction so as to lessen a contone image signal, pixels are placed by the error diffusion method on the black pixel side of an edge. Thereby, the correction processing can be performed with respect to the input binary image signal. At this time, the shape of the cluster of halftone dots is almost maintained, so that an output binary image signal of high image quality can be provided.

Figure 10:
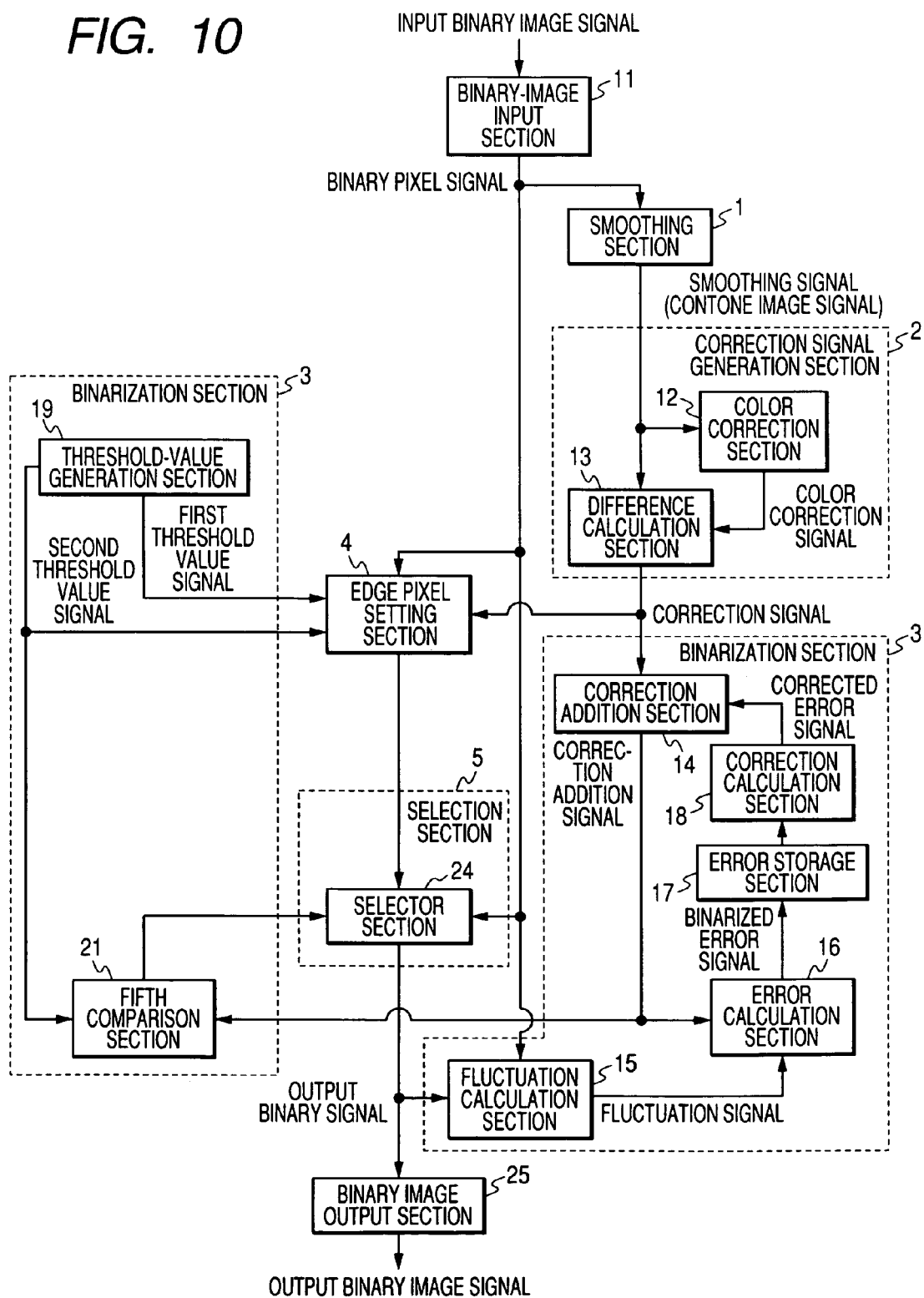
FIG. 10 is a block diagram to show a fourth specific example of the invention.

FIG. 10 is a block diagram to show a fourth specific example of the invention. Parts similar to those previously described with reference to FIG. 4 are denoted by the same reference numerals in FIG. 10 and will not be discussed again. In the first specific example described above, the correction addition signal is classified into the three areas of the positive, zero, and negative areas. When the correction addition signal is in the zero area, setting of assuming the pixel to be an edge is released. To more simplify the configuration, it is also possible to simply binarize the correction addition signal for use without classifying the signal in such a manner. An example of such as implied configuration is shown as a fourth specific example.

In this example, the fourth comparison section 20, the second OR operation section 22, and the fourth AND operation section 23 are not provided, and the fifth comparison section 21 binarizes a correction addition signal by a binary threshold signal and supplies a signal indicating whether or not the correction addition signal is a positive value to the selector section 24.

The selector section 24 receives a signal intact from an edge pixel setting section 4, and selects according to the received signal, either of a binary pixel signal and the binary signal output from the fifth comparison section 21 to output selected one as an output binary signal.

Also in the fourth specific example, when making a correction so as to increase a contone image signal, pixels are placed by the error diffusion method on the white pixel side of an edge; and when making a correction so as to lessen a contone image signal, pixels are placed by the error diffusion method on the black pixel side of an edge. Thereby, correction processing can be performed with respect to an input binary image signal. In the fourth specific example, whether or not the correction addition signal is in the zero area is not determined. Thus, if the error is almost 0, it is not guaranteed to output the binary pixel signal intact. As a result, there is a possibility that a correction error may occur accordingly.

The configuration of the fourth specific example can also be applied to the second and third specific examples described above. In a case of applying the configuration to the second specific example, when the correction addition signal is in the zero area, the original input binary image intact is output. In a case of applying the configuration to the third specific example, if the correction addition signal is in the zero area, it is not guaranteed to output the original input binary image intact.

In every specific example described above, the input binary image signal is smoothed by the smoothing section 1 to generate the contone image signal. Of course, the contone image signal maybe input separately from the input binary image signal. In this case, the smoothing section 1 is not required, and the input contone image signal may be input to the color correction section 12 and the difference calculation section 13. Also, in each specific example described above, the error diffusion method is used as the method of binarizing the contone image signal. However, the method is not limited to it and various binarization methods capable of making pseudo halftone representation can be applied. For example, if a dither method is used, black or white pixels responsive to the correction signal may be placed in the white or black pixel area of the edge portion of each cluster of halftone dots according to a predetermined pattern or in a predetermined order.

As an application example of performing the correction processing with respect to the binary image signal, outputting on a printer with using binary image data after subjected to screen processing at the printing time in remote color proofreading is considered as described in the background of the invention. In such a case, the color output by a printing machine and the color output by a printer can be matched with each other by color correction, and halftone dots formed by screen processing at the printing time can be reproduced; a galley proof closer to actual print than was previously possible can be provided on the printer.

In addition to such a galley proof, the invention can also be used for in-plane unevenness correction, stripe correction, etc., occurring in a printer, for example. Further, in addition to color correction, the invention can also be applied to single-color correction such as density adjustment in a monochrome printer, needless to say.

Figure 11:
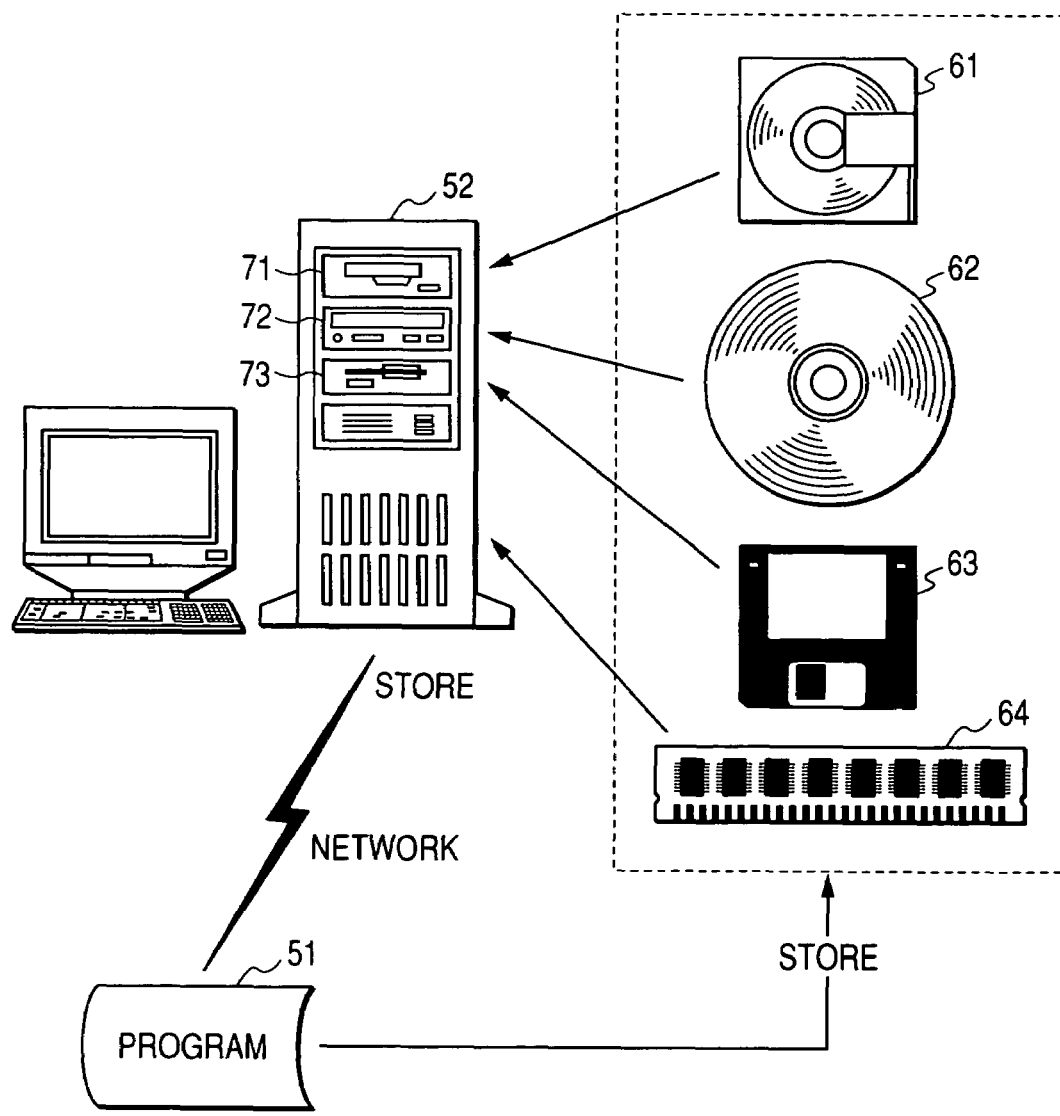
FIG. 11 is a schematic representation of an example of a computer program for implementing the function of the image processing apparatus or the image processing method of the invention and a storage medium storing the computer program.

FIG. 11 is a schematic representation of an example of a computer program for implementing the functions of the image processing apparatus or the image processing method of the invention and a storage medium storing the computer program. In the figure, numeral 51 denotes a program, numeral 52 denotes a computer, numeral 61 denotes a magneto-optical disk, numeral 62 denotes an optical disk, numeral 63 denotes a magnetic disk, numeral 64 denotes memory, numeral 71 denotes a magneto-optical disk drive, numeral 72 denotes an optical disk drive, and numeral 73 denotes a magnetic disk drive.

A part or all of the processing of each section described above in the embodiment and the specific examples can be realized by the program 51 that can be executed by a computer. In this case, the program 51, data used by the program, and the like can also be stored in a storage medium that can be read by a computer. The storage medium is a medium capable of causing change state of energy such as magnetism, light, or electricity in response to the descriptions of the program for a reader provided as the hardware resources of a computer and transferring the descriptions of the program to the reader in the format of a signal corresponding to the change state, such as the magneto-optical disk 61, the optical disk 62 (containing a CD, a DVD, etc.,), the magnetic disk 63, or the memory 64 (containing an IC card, a memory card, etc.,). Of course, the storage media are not limited to portable media.

The program 51 is previously stored in any of the storage media and the storage medium is placed in the magneto-optical disk drive 71, the optical disk drive 72, the magnetic disk drive 73, or a memory slot (not shown) of a computer 52, for example, whereby the program 51 can be read from the computer 51 for executing the functions of the image processing apparatus or the image processing method of the invention. Alternatively, a storage medium may be previously placed or built in the computer 52 and the program 51 may be transferred to the computer 52 through a network, for example, and may be stored in the storage medium for execution.

Of course, some functions can also be implemented as hardware or all may be implemented as hardware. Alternatively, the program can also be formed as one program together with a control program in an output unit. Of course, to apply the program to any other use, the program can also be integrated with a program in the use.

What is claimed is:

1. An image processing apparatus for performing one of color correction and density correction with respect to binary image data with using the binary image data and contone image data, which are based on an original image, to obtain output binary data, the image processing apparatus comprising:

a correction data generation section that performs the one of the color correction and the density correction with respect to the contone image data to generate correction data that is used to correct the binary image data;

a binarization section that binarizes one of (a) the correction data generated by the correction data generation section and (b) the contone image data that has been subjected to the one of the color correction and the density correction, to generate corrected binary data;

an edge pixel setting section that sets a pixel, in the binary image data, assumed to be an edge as an edge pixel; and a selection section that selects, for the pixel set by the edge pixel setting section as the edge pixel, the corrected binary data generated by the binarization section as the output binary data and selects, for a pixel not being set by the edge pixel setting section as the edge pixel, the binary image data as the output binary data, wherein:

the edge pixel setting section detects presence of the edge from the binary image data;

when the correction data generated by the correction data generation section increases a pixel value of the contone image data, the edge pixel setting section sets a pixel located in one of regions sandwiching the edge therebetween as the edge pixel; and when the correction data generated by the correction data generation section lessens the pixel value of the contone image data, the edge pixel setting section sets a pixel located in the other of the regions sandwiching the edge therebetween as the edge pixel.

2. The image processing apparatus according to claim 1, wherein:

when (a) the edge pixel setting section detects the presence of the edge based on pixel values of a given pixel and predetermined neighboring pixels of the binary image data, (b) the pixel value of the given pixel of the binary image data is equal to the binary pixel value located in one of the regions, and (c) the correction data generated by the correction data generation section increases a pixel value of the contone image data, the edge pixel setting section sets the given pixel as the edge pixel; and when (d) the edge pixel setting section detects the presence of the edge based on pixel values of an given pixel and predetermined neighboring pixels of the binary image data, (e) the pixel value of the given pixel of the binary image data is equal to the pixel value located in the other of the regions, and (f) the correction data generated by the correction data generation section lessens the pixel value of the contone image data, the edge pixel setting section sets the given pixel as the edge pixel.

3. The image processing apparatus according to claim 2, wherein:

the edge pixel setting section performs logical OR operation of the given pixel and each of the predetermined neighboring pixels; and when a result of the logical OR operation is true, the edge pixel setting section detects the presence of the edge.

4. The image processing apparatus according to claim 2, wherein:

the edge pixel setting section that subtracts the given pixel from each of the predetermined pixels; and when a result of the subtraction is not equal to 0, the edge pixel setting section detects the presence of the edge.

5. The image processing apparatus according to claim 2, wherein:

the edge pixel setting section compares a pattern of the given pixel and the predetermined neighboring pixels with a pattern stored in advance; and when a comparison results indicates that the pattern of the given pixel and the predetermined neighboring pixels is identical with the pattern stored in advance, the edge pixel setting section detects the presence of the edge.

6. The image processing apparatus according to claim 1, wherein:

the correction data generation section calculates difference data indicating difference between the contone image data and a result of the one of the color correction and the density correction performed with respect to the contone image data; and the correction data generation section sets the difference data as the correction data.

7. The image processing apparatus according to claim 1, further comprising:

a smoothing section that smoothes and converts the binary image data into contone data to generate smoothing data, wherein:

the contone image data is the smoothing data generated by the smoothing section.

8. The image processing apparatus according to claim 1, wherein the binarization section generates the corrected binary data by an error diffusion method based on the correction data generated by the correction data generation section and the output binary data selected by the selection section.

9. The image processing apparatus according to claim 1, wherein the binarization section includes:

a correction addition section that adds the correction data corresponding to the given pixel and binarization error calculated from a pixel that has already been processed to generate correction addition data;

an error calculation section that sets quantization level corresponding to the output binary data selected by the selection section and subtracts the quantization level from the correction addition data generated by the correction addition section to generate the binary error caused in the given pixel; and a correction binarization section that binarizes the correction addition data generated by the correction addition section to generate corrected binary data.

10. The image processing apparatus according to claim 1, wherein the binarization section includes:

a correction addition section that adds the correction data corresponding to the given pixel and binarization error calculated from a pixel that has already been processed to generate correction addition data;

a fluctuation calculation section that calculate fluctuation from a pixel value of the given pixel of the binary image data and the output binary data selected by the selection section to generate fluctuation data;

an error calculation section that sets quantization level corresponding to the fluctuation data generated by the fluctuation calculation section and subtracts the quantization level from the correction addition data generated by the correction addition section to generate the binary error caused in the given pixel; and a correction binarization section that binarizes the correction addition data generated by the correction addition section to generate corrected binary data.

11. The image processing apparatus according to claim 9, wherein:

the binarization section further includes a threshold-value generation section that generates a first threshold value and a second threshold value larger than the first threshold value;

when value of the correction addition data is less than the first threshold value, the correction binarization section allots one of binary to the corrected binary data;

when the value of the correction addition data is equal to or larger than the second threshold value, the correction binarization section allots the other of the binary to the corrected binary data; and when the value of the correction addition data is equal to or larger than the first threshold value and less than the second threshold value, the correction binarization section informs the selection section that the given pixel is not the edge pixel.

12. The image processing apparatus according to claim 10, wherein:

the binarization section further includes a threshold-value generation section that generates a first threshold value and a second threshold value larger than the first threshold value;

when value of the correction addition data is less than the first threshold value, the correction binarization section allots one of binary to the corrected binary data;

when the value of the correction addition data is equal to or larger than the second threshold value, the correction binarization section allots the other of the binary to the corrected binary data; and when the value of the correction addition data is equal to or larger than the first threshold value and less than the second threshold value, the correction binarization section informs the selection section that the given pixel is not the edge pixel.

13. The image processing apparatus according to claim 1, wherein:

the edge pixel setting section determines as to whether or not it is necessary to correct the binary image data with using the correction data generated by the correction data generation section; and when the edge pixel setting section determines that it is not necessary to correct a pixel of the binary image data, the edge pixel setting section does not set the pixel of the binary image data as the edge pixel.

14. The image processing apparatus according to claim 11, wherein:

the edge pixel setting section determines as to whether or not it is necessary to correct the binary image data with using the correction data generated by the correction data generation section based on the first and second threshold values generated by the threshold value generation section; and when the edge pixel setting section determines that it is not necessary to correct a pixel of the binary image data, the edge pixel setting section does not set the pixel of the binary image data as the edge pixel.

15. The image processing apparatus according to claim 12, wherein:

the edge pixel setting section determines as to whether or not it is necessary to correct the binary image data with using the correction data generated by the correction data generation section based on the first and second threshold values generated by the threshold value generation section; and when the edge pixel setting section determines that it is not necessary to correct a pixel of the binary image data, the edge pixel setting section does not set the pixel of the binary image data as the edge pixel.

16. The image processing apparatus according to claim 9, wherein:

the correction addition section sets quantization level corresponding to a value of the given pixel of the binary image data; and the correction addition section adds the quantization level and the correction addition data to generate new correction addition data.

17. The image processing apparatus according to claim 10, wherein:

the correction addition section sets quantization level corresponding to a value of the given pixel of the binary image data; and the correction addition section adds the quantization level and the correction addition data to generate new correction addition data.

18. An image processing method for performing one of color correction and density correction with respect to binary image data with using the binary image data and contone image data, which are based on an original image, to obtain output binary data, the image processing method comprising:

performing the one of the color correction and the density correction with respect to the contone image data to generate correction data that is used to correct the binary image data;

binarizing the correction data generated to generate corrected binary data;

detecting presence of an edge from the binary image data;

when the correction data generated increases a pixel value of the contone image data, setting a pixel located in one of regions sandwiching the edge therebetween as the edge pixel;

when the correction data generated lessens the pixel value of the contone image data, setting a pixel located in the other of the regions sandwiching the edge therebetween as the edge pixel;

selecting, for the pixel set as the edge pixel, the corrected binary data generated as the output binary data; and selecting, for a pixel not being set as the edge pixel, the binary image data as the output binary data.

19. A computer readable recording medium that stores an image processing program for causing a computer to execute an image processing for performing one of color correction and density correction with respect to binary image data with using the binary image data and contone image data, which are based on an original image, to obtain output binary data, the image processing comprising:

performing the one of the color correction and the density correction with respect to the contone image data to generate correction data that is used to correct the binary image data;

binarizing the correction data generated to generate corrected binary data;
detecting presence of an edge from the binary image data;
when the correction data generated increases a pixel value of the contone image data, setting a pixel located in one of regions sandwiching the edge therebetween as the edge pixel;
when the correction data generated lessens the pixel value of the contone image data, setting a pixel located in the other of the regions sandwiching the edge therebetween as the edge pixel;
selecting, for the pixel set as the edge pixel, the corrected binary data generated as the output binary data; and
selecting, for a pixel not being set as the edge pixel, the binary image data as the output binary data.

* * * * *